United States Patent
Miyazawa

(10) Patent No.: US 7,973,750 B2
(45) Date of Patent: Jul. 5, 2011

(54) PROJECTOR WITH DUAL IMAGE FORMATION UNITS AND GREYSCALE

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 748 days.

(21) Appl. No.: 12/061,320

(22) Filed: Apr. 2, 2008

(65) Prior Publication Data

US 2008/0259231 A1 Oct. 23, 2008

(30) Foreign Application Priority Data

Apr. 18, 2007 (JP) ................................ 2007-108978
Mar. 10, 2008 (JP) ................................ 2008-059086

(51) Int. Cl.
*G09G 3/36* (2006.01)

(52) U.S. Cl. .............. 345/87; 345/690; 345/89; 353/34; 353/20; 353/33; 353/31; 353/69

(58) Field of Classification Search ...................... 345/87
See application file for complete search history.

(56) References Cited

U.S. PATENT DOCUMENTS

| | | | | |
|---|---|---|---|---|
| 2002/0067326 A1* | 6/2002 | Aoki | ................ | 345/89 |
| 2002/0186192 A1* | 12/2002 | Maruoka et al. | ................ | 345/87 |
| 2003/0156086 A1* | 8/2003 | Maeda et al. | ................ | 345/89 |
| 2004/0246389 A1* | 12/2004 | Roth | ................ | 349/5 |
| 2006/0092329 A1* | 5/2006 | Noji | ................ | 348/607 |
| 2006/0238551 A1* | 10/2006 | Dalal | ................ | 345/690 |
| 2007/0211218 A1* | 9/2007 | Nitta et al. | ................ | 353/30 |
| 2008/0136763 A1* | 6/2008 | Ohashi et al. | ................ | 345/89 |
| 2008/0259229 A1* | 10/2008 | Oomura et al. | ................ | 349/5 |
| 2008/0297877 A1* | 12/2008 | Miyazawa et al. | ................ | 359/242 |
| 2009/0002633 A1* | 1/2009 | Miyazawa | ................ | 353/20 |
| 2009/0009724 A1* | 1/2009 | Miyazawa | ................ | 353/31 |
| 2009/0015530 A1* | 1/2009 | Goetz et al. | ................ | 345/89 |

FOREIGN PATENT DOCUMENTS

| | | | | |
|---|---|---|---|---|
| JP | 01126678 A | * | 5/1989 |
| JP | A 1-126678 | | 5/1989 |
| JP | A 5-107639 | | 4/1993 |
| JP | 08043728 A | * | 2/1996 |
| JP | 2002016934 A | * | 1/2002 |

* cited by examiner

*Primary Examiner* — Richard Hjerpe
*Assistant Examiner* — Christopher Thompson
(74) *Attorney, Agent, or Firm* — Oliff & Berridge, PLC

(57) ABSTRACT

A projector includes a lighting device, a first image forming unit including first through third light modulation elements, a second image forming unit including fourth through sixth light modulation elements, a polarization combining optical system, a projection optical system, and an image correction device, wherein the image correction device, based on one of combined transmittance and combined reflectance obtained by combining one of transmittances and reflectances corresponding to gray-scale values of two of the first through sixth light modulation elements for modulating the same colored light beam, outputs the drive value corresponding to the input image data for driving the two light modulation elements corresponding to the predetermined colored light beam.

10 Claims, 10 Drawing Sheets

FIRST TABLE
(FIRST LIGHT MODULATION ELEMENT 1300R)

| GRAY-SCALE VALUE | VOLTAGE (V) | TRANSMITTANCE (%) |
|---|---|---|
| 0 | 1.2000 | 0.100 |
| 1 | 1.2006 | 0.104 |
| 2 | 1.2013 | 0.108 |
| 3 | 1.2019 | 0.113 |
| ⋮ | ⋮ | ⋮ |
| 1020 | 1.8382 | 98.87 |
| 1021 | 1.8388 | 99.92 |
| 1022 | 1.8394 | 99.96 |
| 1023 | 1.8400 | 100.00 |

FIG. 3A

SECOND TABLE
(FOURTH LIGHT MODULATION ELEMENT 2300R)

| GRAY-SCALE VALUE | VOLTAGE (V) | TRANSMITTANCE (%) |
|---|---|---|
| 0 | 1.2200 | 0.120 |
| 1 | 1.2207 | 0.123 |
| 2 | 1.2214 | 0.127 |
| 3 | 1.2220 | 0.132 |
| ⋮ | ⋮ | ⋮ |
| 1020 | 1.9790 | 98.88 |
| 1021 | 1.9186 | 99.91 |
| 1022 | 1.9193 | 99.95 |
| 1023 | 1.9200 | 100.00 |

FIG. 3B

THIRD TABLE

| | | FOURTH LIGHT MODULATION ELEMENT 2300R | | | | | | COMBINED NORMALIZED TRANSMITTANCE (%) |
|---|---|---|---|---|---|---|---|---|
| | GRAY-SCALE VALUE | 0 | 1 | 2 | ... | 1022 | 1023 | |
| FIRST LIGHT MODULATION ELEMENT 1300R | 0 | 0.1100 | 0.1115 | 0.1135 | ... | 50.025 | 50.050 | |
| | 1 | 0.1120 | 0.1135 | 0.1155 | ... | 50.027 | 50.052 | |
| | 2 | 0.1140 | 0.1155 | 0.1175 | ... | 50.029 | 50.054 | |
| | ... | ... | ... | ... | ... | ... | ... | |
| | 1022 | 50.040 | 50.042 | 50.044 | ... | 99.955 | 99.980 | |
| | 1023 | 50.060 | 50.064 | 50.064 | ... | 99.975 | 100.000 | |

COMBINED NORMALIZED TRANSMITTANCE (%)

FIG. 4

FOURTH TABLE

| GRAY-SCALE VALUE (20BITS) | GRAY-SCALE VALUE OF FIRST LIGHT MODULATION ELEMENT 1300R (10BITS) | GRAY-SCALE VALUE OF FOURTH LIGHT MODULATION ELEMENT 2300R (10BITS) | COMBINED NORMALIZED TRANSMITTANCE (%) |
|---|---|---|---|
| 0 | 0 | 0 | 0.1100 |
| 1 | 0 | 1 | 0.1115 |
| 2 | 1 | 0 | 0.1120 |
| 3 | 1 | 1 | 0.1135 |
| 4 | 2 | 0 | 0.1135 |
| ... | ... | ... | ... |
| 1048574 | 1022 | 1022 | 99.955 |
| 1048575 | 1023 | 1022 | 99.975 |
| 1048576 | 1022 | 1023 | 99.980 |
| 1048577 | 1023 | 1023 | 100.000 |

FIG. 5

SLIGHTLY CONVERGING INCIDENT LIGHT BEAM

SLIGHTLY DIVERGING INCIDENT LIGHT BEAM

PROJECTOR WITH DUAL IMAGE FORMATION UNITS AND GREYSCALE

BACKGROUND

1. Technical Field

The present invention relates to a projector, an image correction device, and an image correction method.

2. Related Art

In the past, there has been known a method of performing stacked projection of the same image on one screen (projection screen) using two projectors (see e.g., JP-A-5-107639 (Document 1)). The image light thus projected by the stacked projection is roughly doubled in luminance, thus the image light projected on the screen becomes extremely bright.

However, in the case of performing the stacked projection as described above, it is not so easy to accurately overlap the image light beams from the two projectors on the screen. If the image light beams from the two projectors are not accurately overlapped, the image quality of the projection image is degraded.

As a projector in the related art capable of solving such a problem, there is proposed a projector provided with a polarization splitting optical system for splitting a light beam from a lighting device into a light beam having a first polarization component and a light beam having a second polarization component to emit the light beams respectively towards two image forming units, and a polarization combining optical system for combining the image light beams from the two image forming units (see e.g., JP-A-1-126678 (Document 2)).

According to the projector in the related art, since the light beam from the lighting device is split into the first light beam having the first polarization component and the light beam having the second polarization component to form the image light beams in the respective image forming units, and then the two image light beams are combined by the polarization combining optical system to project the combined light beam on the screen by one projection optical system, it becomes possible to accurately overlap the image light beams from the two image forming units on the screen. As a result, it becomes possible to prevent degradation of the image quality of the projection image.

However, according to researches conducted by the inventor of the present invention, it proved that in the projector in the related art color shading occurred in a lateral direction (a horizontal direction) in the image light beam projected on the screen even if the in-plane light intensity distribution of the light beam emitted from the lighting device was equalized using a light equalizing optical system such as a lens integrator. If the color shading occurs in the lateral direction (the horizontal direction) in the image light beam projected on the screen, the image quality of the projection image is problematically degraded.

SUMMARY

An advantage of some aspects of the invention is to provide a projector, an image correction device, and an image correction method capable of preventing the color shading in the image light beams projected on the projection surface from occurring, thereby preventing the degradation of the image quality of the projection image.

The inventor of the present invention conducted thorough researches of causes of occurrence of the color shading in the lateral direction (the horizontal direction) in the image light beam projected on the screen in the projector in the related art.

As a result, there was obtained a finding that the cause was a complex combination of four factors, "(1) the dichroic mirror is disposed at an angle of 45 degree with the system optical axis", "(2) the light beam entering the dichroic mirror is not a perfectly parallel light beam", "(3) the spectral characteristic of the dichroic mirror varies correspondingly to the incident angle of the light beam", and "(4) with respect to the two image light beams respectively emitted from the two image forming units, when focusing attention on the same colored light beam, the colored light beam reflected or transmitted in a near side area of a first dichroic mirror and the colored light beam reflected or transmitted in a near side area of a third dichroic mirror are projected on the projection surface on one side in the lateral direction while the colored light beam reflected or transmitted in a far side area of the first dichroic mirror and the colored light beam reflected or transmitted in a far side area of the third dichroic mirror are projected on the projection surface on the other side in the lateral direction". Hereinafter, detailed explanations will be presented with reference to FIGS. 8 through 11.

FIG. 8 is a diagram schematically showing an optical system of a projector 900 of the related art.

FIGS. 9A and 9B are diagrams provided for explaining a problem of the projector 900 of the related art. FIG. 9A is a diagram schematically showing an angle of the light beam when a slightly converging light beam enters the first dichroic mirror 932, and FIG. 9B is a diagram schematically showing an angle of the light beam when a slightly diverging light beam enters the first dichroic mirror 932.

FIG. 10 is a diagram provided for explaining the spectral characteristic of the first dichroic mirror 932.

FIG. 11 is a diagram schematically showing light paths of light beams passing through the projector 900 of the related art. In FIG. 11, a light path of a light beam entering a near side area along the system optical axis of the first dichroic mirror 932 is denoted with open circles "○", a light path of a light beam entering a far side area along the system optical axis of the first dichroic mirror 932 is denoted with filled circles "●", a light path of a light beam entering a near side area along the system optical axis of the third dichroic mirror 962 is denoted with open triangles "△", and a light path of a light beam entering a far side area along the system optical axis of the third dichroic mirror 962 is denoted with filled circles "▲". It should be noted that in FIG. 11, some optical elements in the lighting device 910, entrance side lenses and relay lenses in relay optical systems 936, 966, light modulation elements 940R, 940G, 940B, 970R, 970G, and 970B, and projection optical system 992 shown in FIG. 8 are omitted from illustration for the sake of simplification of the drawing.

It should also be noted that although the projector 900 in the related art described below is different from the projector described in the Document 2 in that the colored light beams reflected or transmitted by the first through the fourth dichroic mirrors are different, and that cross dichroic prisms are used as the color combining optical system instead of cross dichroic mirrors, the projector 900 has a similar configuration to that of the projector described in Document 2 in the other points, and consequently do not cause any problems in explaining the four factors described above.

As shown in FIG. 8, the projector 900 in the related art is provided with a lighting device 910, a polarization splitting mirror 912 as the polarization splitting optical system, two image forming units 920, 950, a polarization combining prism 990 as the polarization combining optical system, and the projection optical system 992. The color separating optical system 930 in the image forming unit 920 has the first dichroic mirror 932 and the second dichroic mirror 934, while the color separating optical system 960 in the image forming unit 950 has the third dichroic mirror 962 and the fourth dichroic mirror 964. The first dichroic mirror 932 and the third dichroic mirror 962 have a function of reflecting a red light beam and transmitting other colored light beams (a blue light beam and a green light beam), and the second dichroic mirror 934 and the fourth dichroic mirror 964 has a function of reflecting the green light beam and transmitting the blue light beam. Each of the dichroic mirrors 932, 934, 962, and 964 is disposed at an angle of 45 degrees with the system optical axis.

In the projector 900 of the related art, even if the in-plane intensity distribution of the light beam emitted from the lighting device is equalized using the light equalizing optical system, it is quite difficult to perfectly collimate the light beam from the lighting device 910. Therefore, the incident light beam of each of the dichroic mirrors 932, 934, 962, and 964 is not a perfectly collimated light beam but is a slightly converging light beam or a slightly diverging light beam.

For example, in the case in which the slightly converging light beam enters the first dichroic mirror 932, as shown in FIG. 9A, the light beam enters the near side (the side nearer to the lighting device 910) area (hereinafter also referred to simply as "the near side area") along the system optical axis in the first dichroic mirror 932 at a shallow angle with the mirror surface of the first dichroic mirror 932, and the light beam enters the far side (the side further than the lighting device 910) area (hereinafter also referred to simply as "the far side area") along the system optical axis in the first dichroic mirror 932 at a deep angle with the mirror surface of the first dichroic mirror 932.

Further, in the case in which the slightly diverging light beam enters the first dichroic mirror 932r as shown in FIG. 9B, the light beam enters the near side area of the first dichroic mirror 932 at a deep angle with the mirror surface of the first dichroic mirror 932, and the light beam enters the far side area of the first dichroic mirror 932 at a shallow angle with the mirror surface of the first dichroic mirror 932.

As described above, since the spectral characteristic of the first dichroic mirror 932 varies correspondingly to the incident angle of the light beam as shown in FIG. 10 in addition to the fact that the angle of the light beam entering the near side area in the first dichroic mirror 932 and the angle of the light beam entering the far side area therein become different from each other, there should be caused a difference in light intensity between the red light beam reflected in the near side area of the first dichroic mirror 932 and the red light beam reflected in the far side area thereof.

It should be noted that although the explanation is presented here exemplifying the first dichroic mirror 932, the same applies to other dichroic mirrors 934, 962, and 964.

In this case, since each of the optical elements forming the projector 900 is arranged as shown in FIG. 8, with respect to the composite light beam emitted from the polarization combining prism 990, as shown in FIG. 11, the light beam (see the light path of "○") reflected or transmitted in the near side area of the first dichroic mirror 932 is overlapped with the light beam (see the light path of "△") reflected or transmitted in the near side area of the third dichroic mirror 962, and the light beam (see the light path of "●") reflected or transmitted in the far side area of the first dichroic mirror 932 is overlapped with the light beam (see the light path of "▲") reflected or transmitted in the far side area of the third dichroic mirror 962.

Therefore, since the difference in the light intensity (the light intensity variation) caused between the red light beam reflected in the near side area of the first dichroic mirror 932 and the red light beam reflected in the far side area thereof and the difference in the light intensity (the light intensity variation) caused between the red light beam reflected in the near side area of the third dichroic mirror 962 and the red light beam reflected in the far side area thereof should be added to each other, with respect to the red light beam out of the image light beams projected on the screen, the light intensity variation is caused in the lateral direction.

It should be noted that since the same applies to the green light beam and the blue light beam, with respect also to the green light beam and the blue light beam out of the image light beams projected on the screen, the light intensity variation occurs in the lateral direction (the horizontal direction), and as a result, the light intensity variation in the lateral direction (the horizontal direction) should be caused in the image light beams projected on the screen.

As described above, in the projector of the related art, the difference in the light intensity is problematically caused between the light beam reflected or transmitted in the near side area of each of the dichroic mirrors and the light beam reflected or transmitted in the far side area thereof by the factors (1) through (3) described above, and moreover, when the factor (4) described above coincides therewith, the color shading occurs in the lateral direction (the horizontal direction) in the image light beams projected on the screen. It should be noted that since a liquid crystal panel for modulating polarization is used as the light modulation element in the projector of the related art, the color shading, which is caused in the lateral direction (the horizontal direction) in the image light beams projected on the screen by the polarized light beam from the lighting device not perfectly collimated entering the liquid crystal panel, tends to grow.

As a result of further researches based on the above findings repeatedly conducted by the inventor, the inventor perceived that the color shading in the lateral direction in the image light beams projected on the projection surface can be prevented from occurring by executing a software based image correction process thereon, thereby enabling the degradation of the image quality of the projection image to be prevented, thus completing the present invention.

Further, the inventor perceived that by arranging that the colored light beam reflected or transmitted in the near side area of the first dichroic mirror and the colored light beam reflected or transmitted in the near side area of the third dichroic mirror are projected on the projection surface in a horizontally reversed manner, and that the colored light beam reflected or transmitted in the near side area of the second dichroic mirror and the colored light beam reflected or transmitted in the near side area of the fourth dichroic mirror are projected on the projection surface in a horizontally reversed manner, the color shading in the lateral direction in the image light beams projected on the projection surface can be prevented from occurring.

Therefore, by executing the software based image correction process in addition to arranging the optical system as described above, the color shading in the lateral direction of the image light beams projected on the projection surface can further efficiently be prevented, thereby degradation of the image quality of the projection image can be prevented.

Specifically, a projector according to an aspect of the invention includes a lighting device for emitting light including a first colored light beam, a second colored light beam, and a third colored light beam, a first image forming unit including a first color separation optical system for separating the light emitted from the lighting device into the first through third colored light beams, first through third light modulation elements for respectively modulating the first through third colored light beams separated into by the first color separation optical system, and a first color combining optical system for combining the first through third colored light beams respectively modulated by the first through third light modulation elements to output a first image light beam, a second image forming unit including a second color separation optical system for separating the light emitted from the lighting device into the first through third colored light beams, fourth through sixth light modulation elements for respectively modulating the first through third colored light beams separated into by the second color separation optical system, and a second color combining optical system for combining the first through third colored light beams respectively modulated by the fourth through sixth light modulation elements to output a second image light beam, a polarization combining optical system for combining the first image light beam emitted from the first image forming unit and the second image light beam emitted from the second image forming unit, a projection optical system for projecting the image light beam combined by the polarization combining optical system, and an image correction device for outputting drive values corresponding to input image data and for driving respectively the first through sixth light modulation elements, wherein the image correction device, based on one of combined transmittance and combined reflectance obtained by combining one of transmittances and reflectances corresponding to gray-scale values of two of the first through sixth light modulation elements for modulating the same colored light beam for every combination of the gray-scale values which can be output by the two light modulation elements, obtains and outputs the drive value corresponding to the input image data corresponding to the predetermined colored light beam and for driving the two light modulation elements corresponding to the predetermined colored light beam.

As described above, in the projector including two image forming units (the first image forming unit and the second image forming unit) and one projection optical system, by executing the image correction process as described above, the color shading caused in the projection image on the projection surface formed by the first image light beam emitted from the first image forming unit and the second image light beam emitted from the second image forming unit can be prevented, thereby making it possible to prevent degradation of the image quality of the projection image.

Further, in the projector according to an aspect of the invention, assuming that the gray-scale range which can be output by each of the first through sixth light modulation elements includes $2^n$ (n is an integer equal to or greater than one) gray-scale levels, the gray-scale range can be made include $2^{2n}$ gray-scale levels, thus the gray-scale range can dramatically be expanded in comparison with the gray-scale range ($2^n$ gray-scale levels) of a single image forming unit, thereby making it possible to perform a fine correction with high accuracy, and to make a most use of the gray-scale resource.

In a preferable aspect of the invention, in the projector described above, the image correction device sets one of the combined transmittance and the combined reflectance every predetermined position in the two light modulation elements based on one of the combined transmittance and the combined reflectance thus combined and shot image data obtained by shooting the image corresponding to the image light beams projected from the projection optical system, and obtains the drive values for driving the two light modulation elements based on one of the combined transmittance and the combined reflectance thus set for each of the predetermined positions.

By adopting the configuration described above, the color shading caused in the projection image can be prevented, and thus the degradation of the image quality of the projection image can be prevented.

In a preferable aspect of the invention, in the projector described above, the image correction device includes a first table, assuming that a gray-scale range which can be output by each of the first through third light modulation elements includes $2^n$ (n is an integer equal to or greater than one) gray-scale levels, for representing a relationship between each of the $2^n$ gray-scale levels and the drive value for the first through third light modulation elements corresponding to each of the $2^n$ gray-scale levels, a second table, assuming that a gray-scale range which can be output by each of the fourth through sixth light modulation elements includes $2^n$ (n is an integer equal to or greater than one) gray-scale levels, for representing a relationship between each of the $2^n$ gray-scale levels and the drive value for the fourth through sixth light modulation elements corresponding to each of the $2^n$ gray-scale levels, a fourth table formed based on a third table having values, as one of combined normalized transmittance and combined normalized reflectance obtained by normalizing the combined value, the values each obtained by combining one of the transmittances and the reflectances corresponding to each of the $2^n$ gray-scale levels of the two light modulation elements respectively for each of $2^{2n}$ sets of combinations of each of $2^n$ gray-scale levels of the two light modulation elements for modulating the same colored light out of the first through sixth light modulation elements, the fourth table capable of converting one of the combined normalized transmittance and the combined normalized reflectance corresponding to each of the $2^{2n}$ sets of combinations into the gray-scale values in the $2^n$ gray-scale levels of the two light modulation element, and an image correction processing section provided with a function of setting one of the combined normalized transmittance and the combined normalized reflectance for each of predetermined positions in the two light modulation elements based on the shot image data obtained by shooting the image corresponding to the image light beam projected from the projection optical system, obtaining gray-scale values in the $2^n$ gray-scale levels of the two light modulation elements corresponding to one of the combined normalized transmittance and the combined normalized reflectance set for each of the predetermined positions with reference to the fourth table, and obtaining, with reference to the first table and the second table, the drive values to the light modulation elements and corresponding to the gray-scale values of the first image forming unit and the second image forming unit from the obtained gray-scale values in the $2^n$ gray-scale levels of the two light modulation elements.

By the image correction device including such a configuration, the projector capable of preventing the color shading caused in the projection image can be realized.

In a preferable aspect of the invention, in the projector described above, the image correction device includes, assuming that the gray-scale range which can be output by each of the first through third light modulation element includes $2^n$ (n is an integer equal to or greater than one) gray-scale levels, a fourth table representing a relationship between $2^{2n}$ sets of combinations of each of the $2^n$ gray-scale levels of the two light modulation elements for modulating the same colored light beam out of the first through sixth light modulation elements and one of combined normalized transmittance and combined normalized reflectance obtained by normalizing a combined value obtained by combining one of the transmittances and reflectances corresponding to each of the $2^n$ gray-scale levels of the two light modulation elements, and an image correction processing section having a function of setting one of the combined normalized transmittance and the combined normalized reflectance for each of the predetermined positions in the two light modulation elements based on the shot image data obtained by shooting the image corresponding to the image light beam projected from the projection optical system, and obtaining with reference to the fourth table the gray-scale values in the $2^n$ gray-scale levels of the two light modulation elements corresponding to one of the combined normalized transmittance and the combined normalized reflectance set for each of the predetermined positions.

By the image correction device including such a configuration, the projector capable of preventing the color shading caused in the projection image can be realized.

In a preferable aspect of the invention, in the projector described above, one of the combined normalized transmittance and the combined normalized reflectance for each of the predetermined positions in the two light modulation elements is set based on the shot image data, so that the brightness variation existing in the shot image data is suppressed.

By the image correction device including such a configuration, the projector capable of preventing the color shading caused in the projection image can be realized.

In a preferable aspect of the invention, in the projector described above, the fourth table has one of the combined normalized transmittance and the combined normalized reflectance arranged in the order of magnitude.

As described above, by arranging one of the combined normalized transmittance and the combined normalized reflectance in the order of magnitude, the process of obtaining the two gray-scale values in the 2n gray-scale levels of the two light modulation elements corresponding to one of the combined normalized transmittance and the combined normalized reflectance from the fourth table can efficiently be executed.

In a preferable aspect of the invention, in the projector described above, the first through sixth light modulation elements are light modulation elements using liquid crystal, and the drive values for driving the light modulation elements are voltage values applied to the light modulation elements.

In the case with the light modulation elements using liquid crystal, the first and second tables are tables formed in accordance with the VT characteristics of each of the light modulation elements, and the drive values for the respective light modulation elements of the first and second image forming units obtained from the first and second tables are voltage values to be applied to the light modulation elements. Therefore, the transmittance of the light modulation element can be set by setting the voltage value, and the brightness can thus be controlled.

In a preferable aspect of the invention, in the projector described above, the first color separation optical system includes a first dichroic mirror, which separates the light from the lighting device into the first colored light beam and the other colored light beams by reflecting the light in a certain wavelength range and transmitting the light in another wavelength range out of the light from the lighting device, and a second dichroic mirror, which separates the other colored light beams into the second colored light beam and the third colored light beam by reflecting the light in a certain wavelength range and transmitting the light in another wavelength range out of the other colored light beams separated by the first dichroic mirror, the second color separation optical system includes a third dichroic mirror, which separates the light from the lighting device into the first colored light beam and the other colored light beams by reflecting the light in a certain wavelength range and transmitting the light in another wavelength range out of the light from the lighting device, and a fourth dichroic mirror, which separates the other colored light beams into the second colored light beam and the third colored light beam by reflecting the light in a certain wavelength range and transmitting the light in another wavelength range out of the other colored light beams separated by the third dichroic mirror, in each of the first through third colored light beams, the projector is configured so that the colored light beam one of reflected or transmitted in a near side area along the lighting beam axis in the first dichroic mirror and the colored light beam one of reflected or transmitted in a near side area along the lighting beam axis in the third dichroic mirror are projected on the projection screen in a laterally reversed manner, and the projector is configured so that the colored light beam one of reflected or transmitted in a near side area along the lighting beam axis in the second dichroic mirror and the colored light beam one of reflected or transmitted in a near side area along the lighting beam axis in the fourth dichroic mirror are projected on the projection screen in a laterally reversed manner.

By the optical system of the projector including such a configuration, the differences (light intensity variations) in light intensity caused between the colored light beams one of reflected or transmitted in the near side area of the respective dichroic mirrors and the colored light beams one of reflected or transmitted in the far side area of the respective dichroic mirrors become in relationship of reversing with each other. As a result, the color shading in the lateral direction of the image light beam projected on the projection surface can be prevented from occurring. Therefore, by executing the software based image correction process described above in the projector in addition to providing the optical system thus configured, the projection image can be made of higher quality.

It should be noted that in the specification, "the lateral direction (horizontal direction) in the projection surface" denotes the direction parallel to the plane on which the optical elements in the projector are disposed out of the directions parallel to the projection surface.

Further, "the near side along the lighting beam axis in the first dichroic mirror (the second through the fourth dichroic mirrors)" denotes the area closer to the lighting device in the light beam entrance area of the first dichroic mirror (the second through the fourth dichroic mirrors), and "the far side along the lighting beam axis in the first dichroic mirror (the second through the fourth dichroic mirrors)" denotes the area further than the lighting device in the light beam entrance area of the first dichroic mirror (the second through the fourth dichroic mirrors).

According to another aspect of the invention, there is provided an image correction device to be used in a projector, the projector including a lighting device for emitting light including a first colored light beam, a second colored light beam, and a third colored light beam, a first image forming unit including a first color separation optical system for separating the light emitted from the lighting device into the first through third colored light beams, first through third light modulation elements for respectively modulating the first through third colored light beams separated into by the first color separation optical system, and a first color combining optical system for combining the first through third colored light beams respectively modulated by the first through third light modulation elements to output a first image light beam, a second image forming unit including a second color separation optical system for separating the light emitted from the lighting device into the first through third colored light beams, fourth through sixth light modulation elements for respectively modulating the first through third colored light beams separated into by the second color separation optical system, and a second color combining optical system for combining the first through third colored light beams respectively modulated by the fourth through sixth light modulation elements to output a second image light beam, a polarization combining optical system for combining the first image light beam emitted from the first image forming unit and the second image light beam emitted from the second image forming unit, a projection optical system for projecting the image light beam combined by the polarization combining optical system, and an image correction device for outputting drive values corresponding to input image data and for driving respectively the first through sixth light modulation elements, and the image correction device sets one of the combined transmittance and the combined reflectance for every predetermined position in the two light modulation elements, based on one of combined transmittance and combined reflectance obtained by combining one of transmittances and reflectances corresponding to gray-scale values of the two light modulation elements for every combination of the gray-scale values which can be output by the two light modulation elements for modulating the same colored light beam out of the first through sixth light modulation elements and shot image data obtained by shooting the image corresponding to the image light beams projected from the projection optical system, and obtains the drive values for driving the two light modulation elements based on one of the combined transmittance and the combined reflectance thus set for each of the predetermined positions.

By providing the image correction device according to this aspect of the invention to the projector including two image forming units and one projection optical system, the color shading caused in the projection image on the projection surface formed by the first image light beam emitted from the first image forming unit and the second image light beam emitted from the second image forming unit can be prevented, thereby making it possible to prevent degradation of the image quality of the projection image. It should be noted that it is preferable that the image correction device is also provided with the same features as the projector described above.

An image correction method for use with a projector according to another aspect of the invention includes the steps of the projector including a lighting device for emitting light including a first colored light beam, a second colored light beam, and a third colored light beam, a first image forming unit including a first color separation optical system for separating the light emitted from the lighting device into the first through third colored light beams first through third light modulation elements for respectively modulating the first through third colored light beams separated into by the first color separation optical system, and a first color combining optical system for combining the first through third colored light beams respectively modulated by the first through third light modulation elements to output a first image light beam, a second image forming unit including a second color separation optical system for separating the light emitted from the lighting device into the first through third colored light beams, fourth through sixth light modulation elements for respectively modulating the first through third colored light beams separated into by the second color separation optical system, and a second color combining optical system for combining the first through third colored light beams respectively modulated by the fourth through sixth light modulation elements to output a second image light beam, a polarization combining optical system for combining the first image light beam emitted from the first image forming unit and the second image light beam emitted from the second image forming unit, a projection optical system for projecting the image light beam combined by the polarization combining optical system, and an image correction device for outputting drive values corresponding to input image data and for driving respectively the first through sixth light modulation elements, setting one of combined transmittance and combined reflectance obtained by combining one of transmittances and reflectances corresponding to gray-scale values of two of the first through sixth light modulation elements for modulating the same colored light beam for every combination of the gray-scale values which can be output by the two light modulation elements, obtaining shot image data by shooting an image corresponding to the image light beam projected from the projection optical system, setting one of the combined transmittance and the combined reflectance for each of the predetermined positions in the two light modulation elements based on one of the combined transmittance and the combined reflectance and the shot image data, and obtaining the drive values for driving the two light modulation elements based on one of the combined transmittance and the combined reflectance thus set for each of the predetermined positions.

By adopting the image correction method of this aspect of the invention in the projector including two image forming units and one projection optical system, the color shading caused in the projection image on the projection surface formed by the first image light beam emitted from the first image forming unit and the second image light beam emitted from the second image forming unit can be prevented, thereby making it possible to prevent degradation of the image quality of the projection image. It should be noted that it is preferable that the image correction method is also provided with the same features as the projector described above.

In a preferable aspect of the invention, the image correction method further includes the steps of forming a first table, assuming that a gray-scale range which can be output by each of the first through third light modulation elements includes $2^n$ (n is an integer equal to or greater than one) gray-scale levels, for representing a relationship between each of the $2^n$ gray-scale levels and the drive value for the first through third light modulation elements corresponding to each of the $2^n$ gray-scale levels, forming a second table, assuming that a gray-scale range which can be output by each of the fourth through sixth light modulation elements includes $2^n$ (n is an integer equal to or greater than one) gray-scale levels, for representing a relationship between each of the $2^n$ gray-scale levels and the drive value for the fourth through sixth light modulation elements corresponding to each of the $2^n$ gray-scale levels, forming a fourth table representing a relationship between one of the combined normalized transmittance and the combined normalized reflectance corresponding to each of the $2^{2n}$ sets of combinations and the gray-scale values in the $2^n$ gray-scale levels of the two light modulation elements based on a third table having values, as one of combined normalized transmittance and combined normalized reflectance obtained by normalizing the combined value, the values each obtained by combining one of the transmittances and the reflectances corresponding to each of the $2^n$ gray-scale levels of the two light modulation elements respectively for each of $2^{2n}$ sets of combinations of each of $2^n$ gray-scale levels of the two light modulation elements for modulating the same colored light out of the first through sixth light modulation elements, and setting one of the combined normalized transmittance and the combined normalized reflectance for each of predetermined positions in the two light modulation elements based on the image data obtained by shooting the image corresponding to the image light beam projected from the projection optical system, obtaining gray-scale values in the $2^n$ gray-scale levels of the two light modulation elements corresponding to one of the combined normalized transmittance and the combined normalized reflectance set for each of the predetermined positions with reference to the fourth table, and obtaining, with reference to the first table and the second table, the drive values to the light modulation elements and corresponding to the gray-scale values of the first image forming unit and the second image forming unit from the obtained gray-scale values in the $2^n$ gray-scale levels of the two light modulation elements.

BRIEF DESCRIPTION OF THE DRAWINGS

The invention will now be described with reference to the accompanying drawings, wherein like numbers refer to like elements.

FIGS. 3A and 3B are diagrams showing an example of a relationship among a gray-scale value, a voltage, and a transmittance based on the characteristics of first and fourth light modulation elements in a first image forming unit 1100 side and a second image forming unit 2100 side, respectively.

FIG. 4 is a diagram showing an example of a third table formed in accordance with the first table and the second table respectively shown in FIGS. 3A and 3B.

FIG. 5 is a diagram showing an example of a fourth table formed in accordance with the third table shown in FIG. 4.

DESCRIPTION OF EXEMPLARY EMBODIMENTS

Hereinafter, projectors according to the invention will be explained based on the embodiments shown in the accompanying drawings.

Firstly, a configuration of the projector 10 according to an embodiment of the invention will be explained with reference to FIG. 1.

Figure 1:
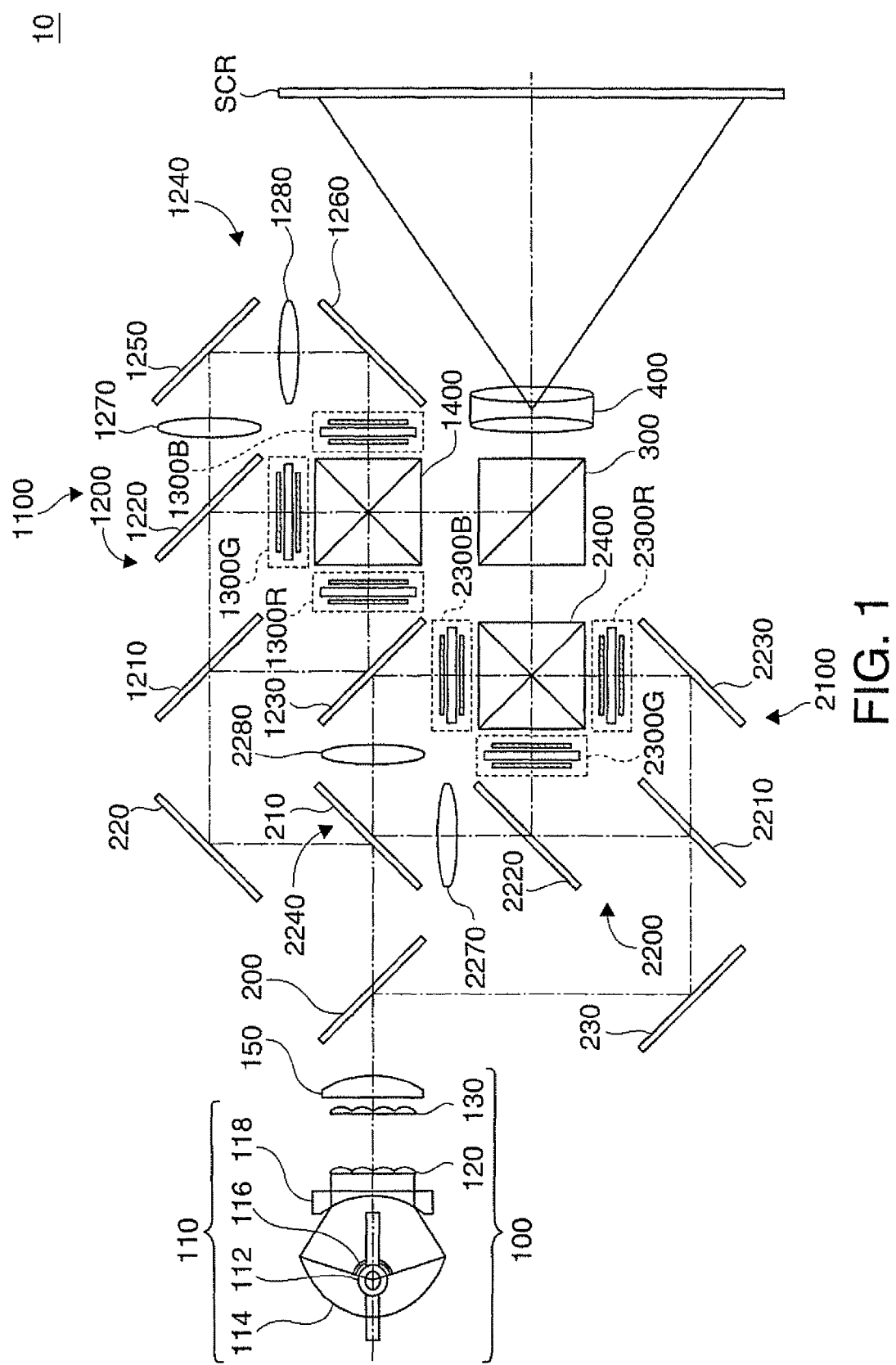
FIG. 1 is a diagram schematically showing an optical system of a projector 10 according to an embodiment of the invention.

FIG. 1 is a diagram schematically showing an optical system of the projector 10 according to the embodiment of the invention. As shown in FIG. 1, the projector 10 according to the embodiment of the invention is provided with a lighting device 100 for emitting a light beam including a red light beam (a first colored light beam), a green light beam (a second colored light beam), and a blue light beam (a third colored light beam), a polarization splitting mirror 200 as a polarization splitting optical system, a double-sided reflecting mirror 210 and a reflecting mirror 220 as a first light guiding optical system, a first image forming unit 1100 as a first image forming section for emitting a first image light beam, a reflecting mirror 230 as a second light guiding optical system, a second image forming unit 2100 as a second image forming section for emitting a second image light beam, a polarization combining prism 300 as a polarization combining optical system, and a projection optical system 400 for projecting the image light beam combined by the polarization combining prism 300.

The lighting device 100 has a light source device 110 for emitting a lighting beam towards an area to be illuminated, a concave lens 118 disposed on the illuminated area side of the light source device 110, a first lens array 120 having first small lenses for dividing the lighting beam emitted from the concave lens 118 into a plurality of partial beams, a second lens array 130 having a plurality of second small lenses corresponding to the plurality of first small lenses of the first lens array 120, and an overlapping lens 150 for overlapping the partial beams emitted from the second lens array 130 with each other in the area to be illuminated.

The light source device 110 has an ellipsoidal reflector 114, a light emitting tube 112 having the emission center in the vicinity of the first focal point of the ellipsoidal reflector 114, a secondary mirror 116 for reflecting light, which is emitted from the light emitting tube 112 towards the area to be illuminated, towards the light emitting tube 112, and the concave lens 11 for substantially collimating the converging light from the ellipsoidal reflector 114 to emit it as a substantially collimated light.

The polarization splitting mirror 200 has a function of splitting the light beam form the lighting device 100 into a light beam (e.g., a p-polarized light beam) having a first polarization component and a light beam (e.g., an s-polarized light beam) having a second polarization component.

The double-sided reflecting mirror 210 and the reflecting mirror 220 as the first light guiding optical system have a function of guiding the light beam, which has the first polarization component and is obtained by the splitting operation of the polarization splitting mirror 200, to the first image forming unit 1100.

The first image forming unit 1100 has a first color separating optical system 1200 for separating the light beam reflected by the reflecting mirror 220 into a red light beam, a green light beam, and a blue light beam, first through third light modulation elements 1301R, 1300G, and 1300B for respectively modulating the colored light beams obtained by the separation operation of the first color separation optical system 1200, and a cross dichroic prism 1400 as a first color combining optical system for combining the red light beam, the green light beam, and the blue light beam respectively modulated by the first through third light modulation elements 1300R, 1300G, and 1300B. A first image light beam having the first polarization component is emitted from the first image forming unit 1100.

The first color separation optical system 1200 has a first dichroic mirror 1210 for separating the light beam reflected by the reflecting mirror 220 into the red light beam and other colored light beams, a second dichroic mirror 1220 for separating the other colored light beams, which are separated from the red light beam by the first dichroic mirror 1210, into the green light beam and the blue light beam, a double-sided reflecting mirror 1230, and a relay optical system 1240. The first color separation optical system 1200 has a function of separating the light beam, which is emitted from the lighting device 100 and then reflected by the reflecting mirror 220, into the three colored light beams, namely the red light beam, the green light beam, and the blue light beam, and guiding them respectively to the first through third light modulation elements 1300R, 1300G, and 1300B.

The light beam with the red light component reflected by the first dichroic mirror 1210 is deflected by the double-sided reflecting mirror 1230, and enters the image forming area of a liquid crystal panel of the first light modulation element 1300R. The light beam with the green light component out of the light beams with the green and blue light components transmitted through the first dichroic mirror 1210 is reflected by the second dichroic mirror 1220, and enters the image forming area of a liquid crystal panel of the second light modulation element 1300G. On the other hand, the light beam with the blue light component is transmitted through the second dichroic mirror 1220, and enters the relay optical system 1240.

The relay optical system 1240 includes an entrance side lens 1270, an entrance side reflecting mirror 1250, a relay lens 1280, and an emission side reflecting mirror 1260, and has a function of guiding the light beam with the blue light component transmitted through the second dichroic mirror 1220 to the liquid crystal panel of the third light modulation element 1300B. The light beam with the blue light component entering the relay optical system 1240 is transmitted through the entrance side lens 1270, deflected by the reflecting mirror 1250, relayed by the relay lens 1280, then deflected by the reflecting mirror 1260, and enters the image forming area of a liquid crystal panel of the third light modulation element 1300B.

The first through third light modulation elements 1300R, 1300G, and 1300B are for modulating the respective lighting beams in accordance with the image information, and form an object to be illuminated by the lighting device 100. The first through third light modulation elements 1300R, 1300G, and 1300B each have the liquid crystal panel, an entrance side polarization plate disposed on the light beam entrance side of the liquid crystal panel, and an emission side polarization plate disposed on the light beam emission side of the liquid crystal panel.

The liquid crystal panel is formed encapsulating a liquid crystal material as an electro-optic material between a pair of transparent glass plates, and modulates the polarization direction of one kind of linearly polarized light beam emitted from the entrance side polarization plate in accordance with image information provided thereto using, for example, polysilicon TFT as switching elements. The entrance side polarization plate, the liquid crystal panel, and the emission side polarization plate perform the light modulation of each of the colored light beams input therein.

The cross dichroic prism 1400 is an optical element for combining optical images modulated for respective colored light beams emitted from the respective emission side polarization plates to form a color image. The cross dichroic prism 1400 has a substantially rectangular planar shape formed of four rectangular prisms bonded with each other, and on the substantially X-shaped interfaces on which the rectangular prisms are bonded with each other, there are formed dielectric multilayer films. The dielectric multilayer film formed on one of the substantially X-shaped interfaces is for reflecting the red light beam, and the dielectric multilayer film formed on the other of the interfaces is for reflecting the blue light beam. The red light beam and the blue light beam are deflected by these dielectric multilayer films to have the proceeding direction aligned with the proceeding direction of the green light, thus the three colored light beams are combined.

The reflecting mirror 230 as the second light guiding optical system has a function of guiding the light beam, which has the second polarization component and is obtained by the splitting operation of the polarization splitting mirror 200, to the second image forming unit 2100.

The second image forming unit 2100 has a second color separating optical system 2200 for separating the light beam reflected by the reflecting mirror 230 into a red light beam, a green light beam, and a blue light beam, fourth through sixth light modulation elements 2300R, 2300G, and 2300B for respectively modulating the colored light beams obtained by the separation operation of the second color separation optical system 2200, and a cross dichroic prism 2400 as a second color combining optical system for combining the red light beam, the green light beam, and the blue light beam respectively modulated by the fourth through sixth light modulation elements 2300R, 2300G, and 2300B. A second image light beam having the second polarization component is emitted from the second image forming unit 2100.

The second color separation optical system 2200 has a third dichroic mirror 2210 for separating the light beam reflected by the reflecting mirror 230 into the red light beam and other colored light beams, a fourth dichroic mirror 2220 for separating the other colored light beams, which are separated from the red light beam by the third dichroic mirror 2210, into the green light beam and the blue light beam, and a relay optical system 2240. The second color separation optical system 2200 has a function of separating the light beam, which is emitted from the lighting device 100 and then reflected by the reflecting mirror 230, into the three colored light beams, namely the red light beam, the green light beam, and the blue light beam, and guiding them respectively to the fourth through sixth light modulation elements 2300R, 2300G, and 2300B.

The light beam with the red light component transmitted through the third dichroic mirror 2210 is deflected by the reflecting mirror 2230, and enters the image forming area of a liquid crystal panel of the fourth light modulation element 2300R. The light beam with the green light component out of the light beams with the green and blue light components reflected by the third dichroic mirror 2210 is reflected by the fourth dichroic mirror 2220, and enters the image forming area of a liquid crystal panel of the fifth light modulation element 2300G. On the other hand, the light beam with the blue light component is transmitted through the fourth dichroic mirror 2220, and enters the relay optical system 2240.

The relay optical system 2240 includes an entrance side lens 2270, an entrance side reflecting mirror 2250, a relay lens 2280, and an emission side reflecting mirror 2260, and has a function of guiding the light beam with the blue light component transmitted through the fourth dichroic mirror 2220 to the liquid crystal panel of the sixth light modulation element 2300B. The light beam with the blue light component entering the relay optical system 2240 is transmitted through the entrance side lens 2270, deflected by the double-sided reflecting mirror 210, relayed by the relay lens 2280, then deflected by the double-sided reflecting mirror 1230, and enters the image forming area of a liquid crystal panel of the sixth light modulating element 2300B. It should be noted that in the projector 10 according to the embodiment of the invention, the double-sided reflecting mirror 210 of the first light guiding optical system and the double-sided reflecting mirror 1230 of the first color separation optical system 1200 are used also as the reflecting mirrors of the relay optical system 2240.

Since the fourth through sixth light modulation elements 2300R, 2300G, and 2300B and the cross dichroic prism 2400 respectively have substantially the same configurations as the first through third light modulation elements 1300R, 1300G, and 1300B and the cross dichroic prism 1400, detailed explanations therefor will be omitted.

The polarization combining prism 300 has a polarization combining surface for combining the light beam with the first polarization component and the light beam with the second polarization component with each other, and combines a first image light beam emitted from the first image forming unit 1100 and a second image light beam emitted from the second image forming unit 2100 with each other to emit it to the projection optical system 400.

The color image emitted from the polarization combining prism 300 is enlargedly projected by the projection optical system 400 to form a large screen image on the screen SCR.

The projector 10 according to the embodiment has the configuration and arrangement of the optical elements as described above. Thus, it is arranged that the light beam reflected or transmitted in the near side area of the first dichroic mirror 1210 and the light beam reflected or transmitted in the near side area of the third dichroic mirror 2210 are projected on the screen SCR in a laterally reversed manner, and it is also arranged that the light beam reflected or transmitted in the near side area of the second dichroic mirror 1220 and the light beam reflected or transmitted in the near side area of the fourth dichroic mirror 2220 are projected on the screen SCR in a laterally reversed manner. Hereinafter, detailed explanations will be presented with reference to FIG. 2.

Figure 2:
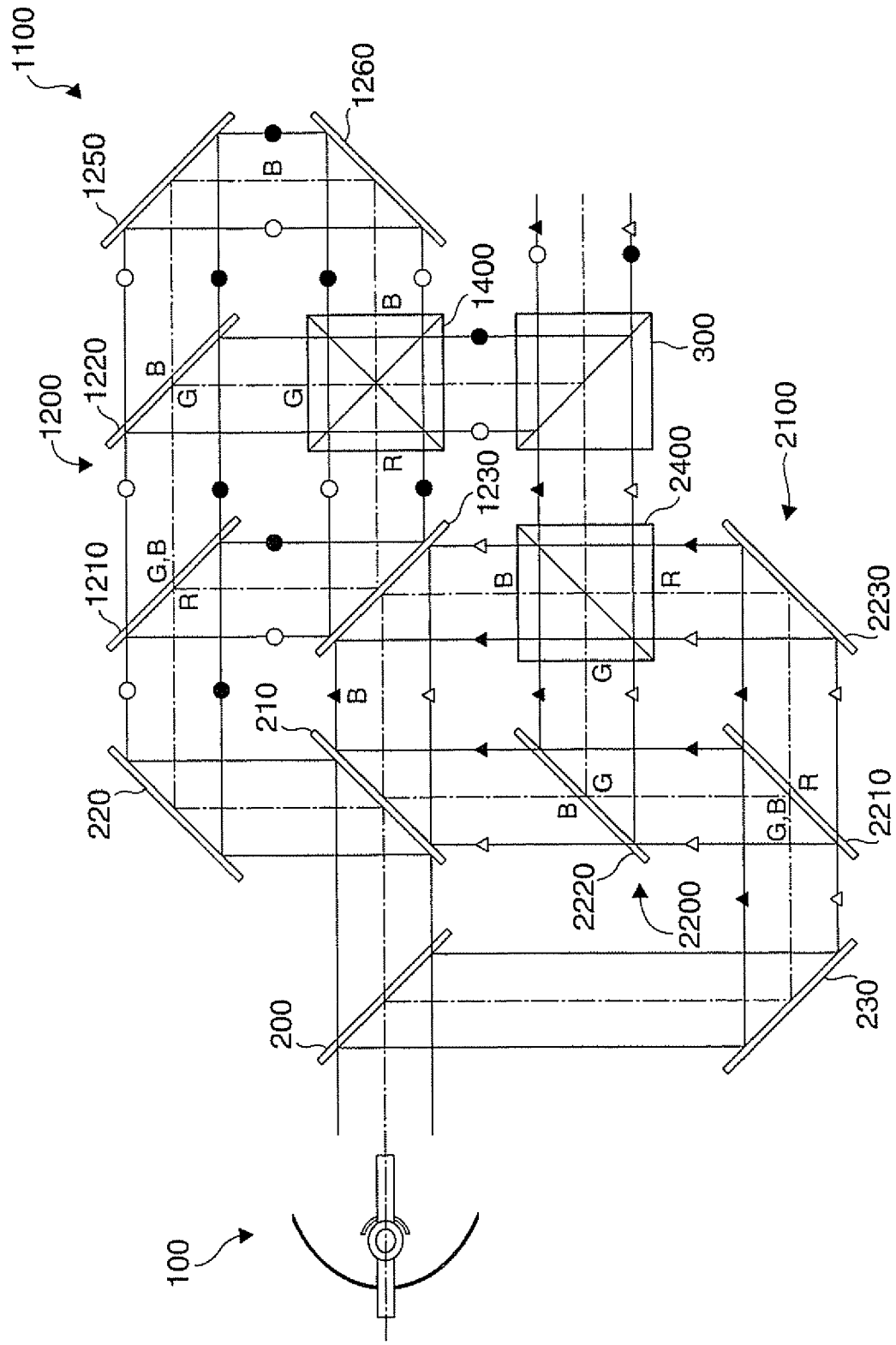
FIG. 2 is a diagram schematically showing light paths of light beams passing through the projector 10 according to the embodiment of the invention.

FIG. 2 is a diagram schematically showing light paths of light beams passing through the projector 10 according to the embodiment of the invention. In FIG. 2, a light path of a light beam entering a near side area along the system optical axis of the first dichroic mirror 1210 is denoted with open circles "○", a light path of a light beam entering a far side area along the system optical axis of the first dichroic mirror 1210 is denoted with filled circles "●", a light path of a light beam entering a near side area along the system optical axis of the third dichroic mirror 2210 is denoted with open triangles "△", and a light path of a light beam entering a far side area along the system optical axis of the third dichroic mirror 2210 is denoted with filled triangles "▲". It should be noted that in FIG. 2, some optical elements in the lighting device 100, the entrance side lenses 1270, 2270 and the relay lenses 1280, 2280 in the relay optical systems 1240, 2240, the first through sixth light modulation elements 1300R, 1300G, 1300B, 2300R, 2300G, and 2300B, and projection optical system 400 shown in FIG. 1 are omitted from illustration for the sake of simplification of the drawing.

In the projector 10 according to the embodiment of the invention, as shown in FIG. 2, the red light beam (see the light path of "○") reflected in the near side area of the first dichroic mirror 1210 is overlapped with the red light beam (see the light path of "▲") transmitted in the far side area of the third dichroic mirror 2210, and the red light beam (see the light path of "●") reflected in the far side area of the first dichroic mirror 1210 is overlapped with the red light beam (see the light path of "△") transmitted in the near side area of the third dichroic mirror 2210.

Therefore, even in the case in which the differences in light intensity between the light beams reflected or transmitted in the near side areas and the light beams reflected or transmitted in the far side area thereof of the respective dichroic mirrors 1210, 1220, 2210, and 2220 are caused by the factors (1) through (3) described above, the difference (the light intensity variation) in light intensity caused between the red light beam reflected in the near side area of the first dichroic mirror 1210 and the red light beam reflected in the far side area thereof and the difference (the light intensity variation) in light intensity caused between the red light beam transmitted in the near side area of the third dichroic mirror 2210 and the red light beam transmitted in the far side area thereof are in a relationship of reversing with each other.

As a result, with respect to the red light beam out of the image light beams to be projected on the screen SCR, the light intensity variation in the lateral direction (the horizontal direction) can be prevented from occurring.

Regarding the green light beam, similarly to the above, the green light beam (see the light path of "○") reflected in the near side area of the second dichroic mirror 1220 is overlapped with the green light beam (see the light path of "▲") reflected in the far side area of the fourth dichroic mirror 2220, and the green light beam (see the light path of "●") reflected in the far side area of the second dichroic mirror 1220 is overlapped with the green light beam (see the light path of "△") reflected in the near side area of the fourth dichroic mirror 2220.

Therefore, the difference (the light intensity variation) in light intensity caused between the green light beam reflected in the near side area of the second dichroic mirror 1220 and the green light beam reflected in the far side area thereof and the difference (the light intensity variation) in light intensity caused between the green light beam reflected in the near side area of the fourth dichroic mirror 2220 and the green light beam reflected in the far side area thereof are reversed with each other. As a result, with respect to the green light beam out of the image light beams to be projected on the screen SCR, the light intensity variation in the lateral direction (the horizontal direction) can be prevented from occurring.

Regarding the blue light beam, similarly to the above, the blue light beam (see the light path of "○") transmitted in the near side area of the second dichroic mirror 1220 is overlapped with the blue light beam (see the light path of "▲") transmitted in the far side area of the fourth dichroic mirror 2220, and the blue light beam (see the light path of "●") transmitted in the far side area of the second dichroic mirror 1220 is overlapped with the blue light beam (see the light path of "△") transmitted in the near side area of the fourth dichroic mirror 2220.

Therefore, the difference (the light intensity variation) in light intensity caused between the blue light beam transmitted in the near side area of the second dichroic mirror 1220 and the blue light beam transmitted in the far side area thereof and the difference (the light intensity variation) in light intensity caused between the blue light beam transmitted in the near side area of the fourth dichroic mirror 2220 and the blue light beam transmitted in the far side area thereof are reversed with each other. As a result, with respect to the blue light beam out of the image light beams to be projected on the screen SCR, the light intensity variation in the lateral direction (the horizontal direction) can be prevented from occurring.

Although the color shading in the lateral direction of the image light beams projected on the screen SCR can be prevented from occurring by the optical system of the projector having the configuration as described above, by executing a software based image correction thereon in addition to the configuration of the optical system of the projector described above, a further effect of prevention of the color shading can be obtained. An example of performing the prevention of the color shading by executing the software based image correction process will hereinafter be explained.

FIGS. 3A and 3B are diagrams showing an example of a relationship among a gray-scale value, a voltage, and a transmittance based on the characteristics of respective light modulation elements in the first image forming unit 1100 side and the second image forming unit 2100 side. FIG. 3A is a table (hereinafter referred to as a first table) showing a relationship among the gray-scale value, the voltage, and the transmittance of the first light modulation element 1300R corresponding to the red light beam (R) out of the first through third light modulation elements 1300R, 1300G, and 1300B, and FIG. 3B is a table (hereinafter referred to as a second table) showing a relationship among the gray-scale value, the voltage, and the transmittance of the fourth light modulation element 2300R likewise corresponding to the red light beam (R) out of the fourth through sixth light modulation elements 2300R, 2300G, and 2300B.

In the projector according to the embodiment of the invention, it is arranged that each of the light modulation elements of RGB is capable of outputting $2^{10}$ (1024) levels of gray-scale value. Therefore, FIGS. 3A and 3B shows the transmittance correspondingly to each of the 1024 levels of gray-scale value (0 through 1023) and the voltage value thereof for obtaining the transmittance thereto. It should be noted that in this case, the transmittance is represented assuming that the transmittance corresponding to the maximum gray-scale value (1023 in this case) is 100% so that the transmittance corresponding to the gray-scale range of 0 through 1023 is represented in a range of 0 through 100%. It should also be noted that since slight leakage light exists in the voltage value corresponding to the gray-scale value "0", the transmittance corresponding to the gray-scale "0" is assumed to be "0.100%" in the first light modulation element 1300R on the side of the first image forming unit 1100, and "0.120%" in the fourth light modulation element 2300R on the side of the second image forming unit 2100 in this case as shown in FIGS. 3A and 3B.

Further, although FIGS. 3A and 3B show the cases of the first light modulation element 1300R and the fourth light modulation element 2300R corresponding to the red light beam, the first table and the second table are also formed correspondingly to the light modulation elements (the second light modulation element 1300G, the third light modulation element 1300B, the fifth light modulation element 2300G, and the sixth light modulation element 2300B) corresponding to the other colors.

FIG. 4 is a diagram showing an example of a table (hereinafter referred to as a third table) formed in accordance with the first table and the second table respectively shown in FIGS. 3A and 3B. The third table shown in FIG. 4 is a table for representing the value obtained by combining the transmittances corresponding respectively to the gray-scale values (0 through 1023) of the first light modulation element 1300R and the fourth light modulation element 2300R for each combinations ($2^{20}$ sets of combinations) of the levels (0 through 1023) of the gray-scale values of the first light modulation element 1300R and the fourth light modulation element 2300R as a combined transmittance. It should be noted that the combined value is divided by two so that the combined value is normalized within a range of 0 through 100%, and the obtained transmittance in the range of 0 through 100% is assumed to be referred to as a combined normalized transmittance.

In FIG. 4, for example, the combined normalized transmittance "0.110%" corresponding to the combination of the gray-scale value "0" of the first light modulation element 1300R and the gray-scale value "0" of the fourth light modulation element 2300R can be obtained by the calculation of "(0.100%+0.120%)÷2=0.110%" since the transmittance corresponding to the gray-scale value "0" of the first light modulation element 1300R is "0.100%" according to FIG. 3A, and the transmittance corresponding to the gray-scale value "0" of the fourth light modulation element 2300R is "0.120%" according to FIG. 3B.

As described above, the transmittances are combined for each of the combinations ($2^{20}$ sets of combinations) of the gray-scale values of the first light modulation element 1300R and the fourth light modulation element 2300R, and the value obtained by the combination is divided by two, thereby obtaining the value as the combined normalized transmittance in the range of "0 through 100%".

FIG. 5 is a diagram showing an example of a table (hereinafter referred to as a fourth table) formed in accordance with the third table shown in FIG. 4. The fourth table shown in FIG. 5 is a table in which values of the combined normalized transmittance in the third table shown in FIG. 4 are arranged in the order of magnitude (the ascending order in this case), and the combined normalized transmittance thus arranged, the combinations ($2^{20}$ sets of combinations) of the levels of the gray-scales of the first light modulation element 1300R and the fourth light modulation element 2300R, and the gray-scale value of $2^{20}$ levels (the gray-scale value represented with 20 bits) are made correspond to each other.

According to the fourth table, the $2^{20}$ combinations corresponding to the combined normalized transmittance can be obtained from the combined normalized transmittance. For example, the combination of the gray-scale values of the first light modulation element 1300R and the fourth light modulation element 2300R corresponding to the combined normalized transmittance of 99.975% can be obtained as the combination of the gray-scale value of "1023" of the first light modulation element 1300R and the gray-scale value of "1022" of the fourth light modulation element 2300R according to the fourth table shown in FIG. 5.

As described above, when the gray-scale value of the first light modulation element 1300R and the gray-scale value of the fourth light modulation element 2300R corresponding to the desired combined normalized transmittance are obtained from the fourth table, the voltage values necessary for obtaining the respective gray-scale values thus obtained can be obtained from the first and the second tables. Further, by driving the respective light modulation elements with the obtained voltage values, the intensity (hereinafter referred to as "brightness") of the corresponding position (pixel) on the screen can be set.

It should be noted that although the fourth table shown in FIG. 5 can be formed for every pixel in each of the light modulation elements, it is also possible that a plurality of specific pixels (hereinafter referred to as specific pixels) is selected so that the specific pixels are distributed properly in the entire area of each of the light modulation elements and the fourth table is prepared for each of the specific pixels thus selected for the sake of simplification of the processing. In the present embodiment of the invention, it is assumed that the fourth table is formed for each of the specific pixels of, for example, 22 points in the vertical direction and 32 points in the lateral direction of each of the light modulation elements.

Further, the fourth table can be formed for every area composed of a plurality of pixels instead of every pixel. In this case, a plurality of specific areas (hereinafter referred to as specific areas) are selected so that the specific areas are distributed properly in the entire area of each of the light modulation elements, and the fourth table is prepared for each of the specific areas thus selected.

Further, the although the explanation described hereinabove is for the first light modulation element 1300R and the fourth light modulation element 2300R, the first through the fourth tables are similarly formed correspondingly to the light modulation elements (the second and third light modulation elements 1300G, 1300B, and the fifth and sixth light modulation elements 2300G, 2300B) corresponding to the other colored lights (the green light beam and the blue light beam).

Figure 6:
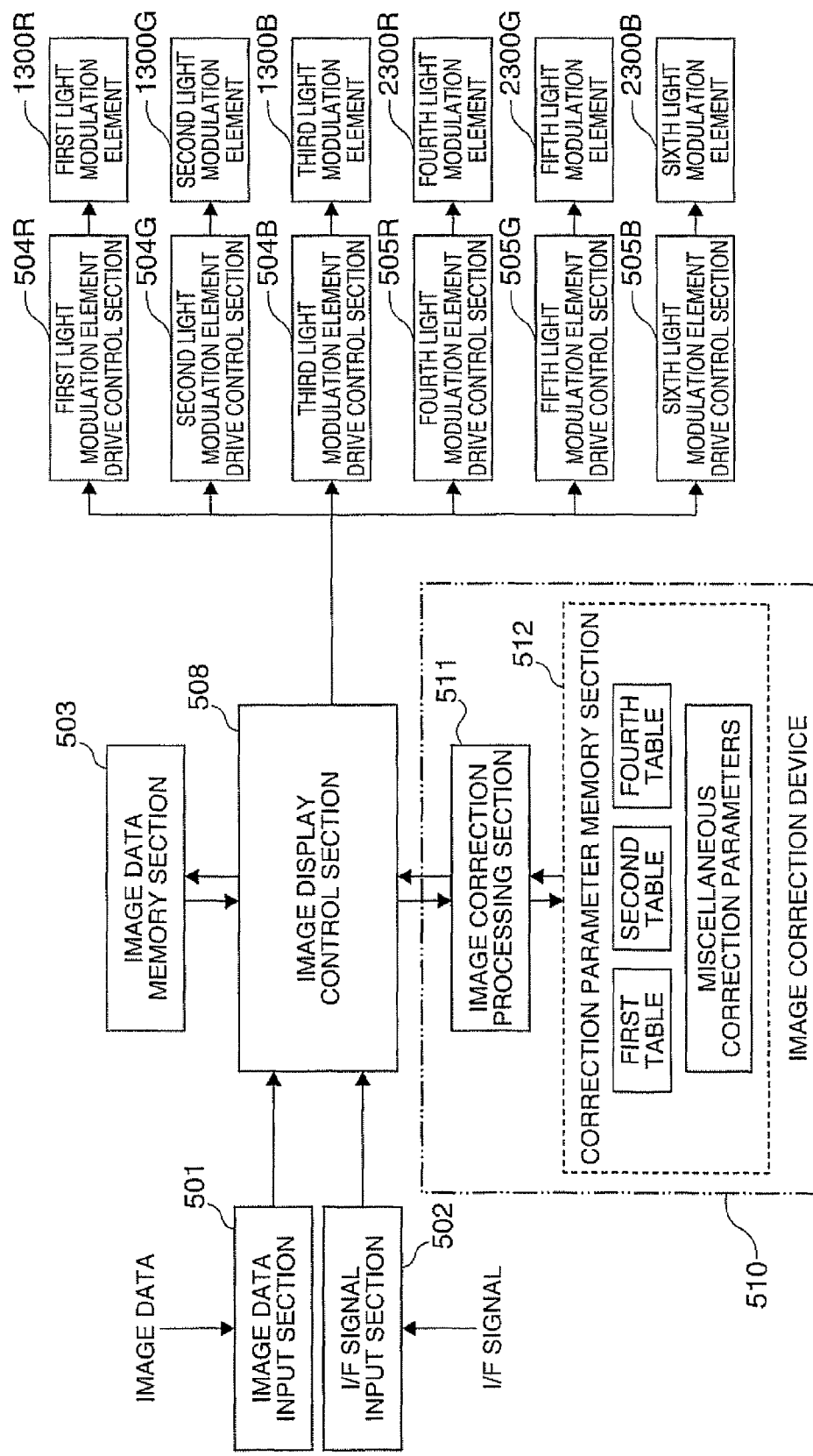
FIG. 6 is a configuration diagram for explaining a function of the projector 10 according to the embodiment of the invention.

FIG. 6 is a configuration diagram for explaining a function of the projector according to the embodiment of the invention. As shown in FIG. 6, the projector according to the embodiment of the invention has an image data input section 501 for inputting image data to be projected, an I/F signal input section 502 for inputting a signal corresponding to an instruction of the user and so on as an interface signal (hereinafter referred to as an I/F signal), an image data memory section 503 for storing the image data (e.g., the image data corresponding to one frame) necessary for performing the projection process, first through third light modulation element drive control sections 504R, 504G, and 504B for performing drive control of the light modulation elements (the first light modulation element 1300R, the second light modulation element 1300G, and the third light modulation element 1300B) of RGB in the first image forming unit 1100, fourth through sixth light modulation element drive control sections 505R, 505G, and 505B for performing drive control of the light modulation elements (the fourth light modulation element 2300R, the fifth light modulation element 2300G, and the sixth light modulation element 2300B) of RGB in the second image forming unit 2100, an image correction device 510 for executing various image corrections, and an image display control section 508 for performing overall control such as control for the image correction device 510 or control for various light modulation elements.

The image correction device 510 has an image correction processing section 511 for executing a brightness variation correction process for correcting the brightness variation of the image light beams emitted from the first image forming unit 1100 and the second image forming unit 2100 and various correction processes (e.g., a correction process common to the first image forming unit 1100 and the second image forming unit 2100) other than the brightness variation correction process, and a correction parameter memory section 512 for storing various correction parameters used by the image correction processing section 511 executing the correction.

It should be noted that although the first through fourth tables (see FIGS. 3A, 3B, 4, and 5) used for the brightness variation correction process are stored in the correction parameter memory section 512, the third table is used when forming the fourth table from the first and second tables, and consequently, is not particularly necessary for the brightness variation correction process executed by the image correction processing section 511. Therefore, there is no particular necessity for storing the third table in the correction parameter memory section 512. Therefore, in the correction parameter memory section 512 shown in FIG. 6, there are only shown the fourth table and the first and second tables as the tables necessary for executing the brightness variation correction process.

The image correction processing section 511 executes one or more of correction processes common to the first image forming unit 1100 and the second image forming unit 2100 or the like such as an edge emphasizing process, a color conversion process, or γ-correction process on the one frame of image data stored in the image data memory section 503, and then executes the brightness variation correction process finally thereon.

In the brightness variation correction process executed by the image correction processing section 511, there is performed a process of setting voltages applied to the first through sixth light modulation elements referring to the fourth table, the first and second tables based on shot image data obtained by shooting the image projected on the screen SCR so that the brightness variation existing in the image on the screen SCR is corrected. It should be noted that it is assumed that the brightness variation correction process is executed, and as a result, the color shading in the projection image on the screen SCR can be prevented from occurring.

Then, the brightness variation correction process for correcting the brightness variation of the image light beams emitted from the first image forming unit 1100 and the second image forming unit 2100 will specifically be explained. Firstly, on the side of the first image forming unit 1100, the image data to be projected is applied to the first light modulation element 1300R to project the image corresponding to the image data on the screen SCR in the condition in which the transmittance of the first light modulation element 1300R is set to be 100%, for example, and the brightness on the screen SCR is obtained for each of the specific pixels based on shot image data (hereinafter referred to as first shot image data) obtained by shooting the image corresponding to the image data and projected on the screen SCR.

Likewise, also on the side of the second image forming unit 2100, the image data to be projected is applied to the second image forming unit 2100 to project the image corresponding to the image data on the screen SCR in the condition in which the transmittance of the fourth light modulation element 2300R is set to be 100%, for example, and the brightness on the screen SCR is obtained for each of the specific pixels based on image data (hereinafter referred to as second shot image data) obtained by shooting the image corresponding to the image data and projected on the screen SCR.

Then, the combined normalized transmittance, which is obtained by combining the transmittance corresponding to the brightness in each of the specific pixels obtained based on the first shot image data and the transmittance corresponding to the brightness in each of the specific pixels obtained based on the second shot image data and dividing the combined transmittance by two, is obtained.

Then, taking the darkest area of the areas (areas with a predetermined range surrounding the specific pixels and taking the specific pixels as the substantial center thereof, respectively) on the screen SCR as a reference, the brightness of the each of the light modulation elements 1300R, 2300R at each of the specific pixels is controlled so that the brightness of the entire areas becomes substantially the same. In this case, the fourth table (see FIG. 5) described above is used.

In this case, since the first light modulation element 1300R and the fourth light modulation element 2300R are both provided with the voltages to provide the transmittance of 100%, taking the brightness in the darkest area (assuming the area A1, not shown) as a reference, the transmittances in the other areas (assuming the areas A2, A3, not shown) are adjusted so that the brightness becomes constant.

Here, what combined normalized transmittances should be set to the areas A2, A3 in order for obtaining the same brightness in the areas A2, A3 as the brightness in the area A1 is set. Further, in the case in which the combined normalized transmittances set in the areas A2, A3 are, for example, 99.980% in the area A2 and 99.955% in the area A3, the combination of the gray-scale values of the first light modulation element 130R and the fourth light modulation element 2300R corresponding to each of the combined normalized transmittances are obtained with reference to the fourth table shown in FIG. 5.

In this case, in the area A2, with reference to the fourth table, the combination of the gray-scale value "1022" of the first light modulation element 1300R and the gray-scale value "1023" of the fourth light modulation element 2300R is obtained, and in the area A3, with reference to the fourth table, the combination of the gray-scale value "1022" of the first light modulation element 1300R and the gray-scale value "1022" of the fourth light modulation element 2300R is obtained. It should be noted that it is assumed that in the case in which the same combined normalized transmittance as the combined normalized transmittance to be set does not exist in the fourth table, the closest combined normalized transmittance to the combined normalized transmittance to be set is found from the fourth table, and the combination of the gray-scale values of the first light modulation element 1300R and the fourth light modulation element 2300R corresponding to the combined normalized transmittance thus found is obtained.

Further, in some cases, there are two or more combinations of the gray-scale values of the first light modulation element 1300R and the fourth light modulation element 2300R corresponding to the same combined normalized transmittance. For example, as a simple example, the combined normalized transmittance of 50% can be obtained in the case in which the first light modulation element 1300R has the transmittance of 2% and the fourth light modulation element 2300R has the transmittance of 98% or in the case in which the first light modulation element 1300R has the transmittance of 90% and the fourth light modulation element 2300R has the transmittance of 10%. As described above, although there are some cases in which two or more combinations of the gray-scale values of the first light modulation element 1300R and fourth light modulation element 2300R corresponding to the same combined normalized transmittance exist, it is preferable to select the combination of the gray-scale values having the transmittances of the first light modulation element 1300R side and the fourth light modulation element 2300R side are as close as possible.

For example, as the combination of the gray-scale values of the first light modulation element 1300R and the fourth light modulation element 2300R corresponding to the combined normalized transmittance of 50%, the combination of the gray-scale value in the first light modulation element 1300R side providing the transmittance of 49% and the gray-scale value in the fourth light modulation element 2300R side providing the transmittance of 51%, or the combination of the gray-scale value in the first light modulation element 1300R side providing the transmittance of 50% and the gray-scale value in the fourth light modulation element 2300R side likewise providing the transmittance of 50%, or the like is preferable, and either one of the preferable combinations described above is selected.

As described above, when the combination of the gray-scale values of the first light modulation element 1300R of the first image forming unit 1100 and the fourth light modulation element 2300R of the second image forming unit 2100 is obtained, than the voltage value corresponding to the gray-scale value of the first light modulation element 1300R and the voltage value corresponding to the gray-scale value of the fourth light modulation element 2300R are obtained with reference to the first and second tables (see FIGS. 3A and 3B).

For example, in the area A2, since the gray-scale value of the first light modulation element 1300R is "1022" and the gray-scale value of the fourth light modulation element 2300R is "1023", with reference to the first and second tables, the voltage value of 1.8394 volt is obtained as the voltage value corresponding to the gray-scale value of the first light modulation element 1300R, and the voltage value of 1.9200 volt is obtained as the voltage value corresponding to the gray-scale value of the fourth light modulation element 2300R.

Thus, by driving the first light modulation element 1300R with the voltage value of 1.8394 volt in the first image forming unit 1100, and driving the fourth light modulation element 2300R with the voltage value of 1.9200 volt in the second image forming unit 2100, the combined normalized transmittance of 99.98% of the first image forming unit 1100 and the second image forming unit 2100 of the specific pixel in the area A2 can be obtained. Thus, the brightness of the specific pixel in the area A2 can be made substantially the same as the brightness of the specific pixel in the area A1. The same process is executed with respect to the area A3.

Although the example described above is the brightness correction process of the specific pixels in the areas A2, A3, also in the other areas, the same brightness correction process is executed for each of the specific pixels existing in such areas. It should be noted that the brightness correction process with respect to the other pixels than the specific pixels can be executed by executing, for example, an interpolation process such as a linear interpolation process on the correction results obtained in the specific pixels in the respective areas.

Further, although in the case of the example described above, the transmittances of the first light modulation element 1300R of the first image forming unit 1100 and the fourth light modulation element 2300R are assumed to be 100%, the same process is performed while setting the transmittances of the respective light modulation elements to some representative values within the range of 0 through 100%.

Further, although in the example described above, the first light modulation element 1300R and the fourth light modulation element 2300R corresponding to the red light beams in the first image forming unit 1100 and the second image forming unit 2100 are explained, the same process is executed also on the light modulation elements (the second light modulation element 1300G, the third light modulation element 1300B, the fifth light modulation element 2300G, and the sixth light modulation element 2300B) corresponding to the other colors using the fourth table and the first and second tables formed correspondingly thereto.

By executing the brightness variation correction process as described above, the color shading caused in the projection image on the screen formed by combining the first image light beam emitted from the first image forming unit 1100 and the second image light beam emitted from the second image forming unit 2100 can be prevented, thus degradation of the image quality of the projection image can be prevented.

Figure 7:
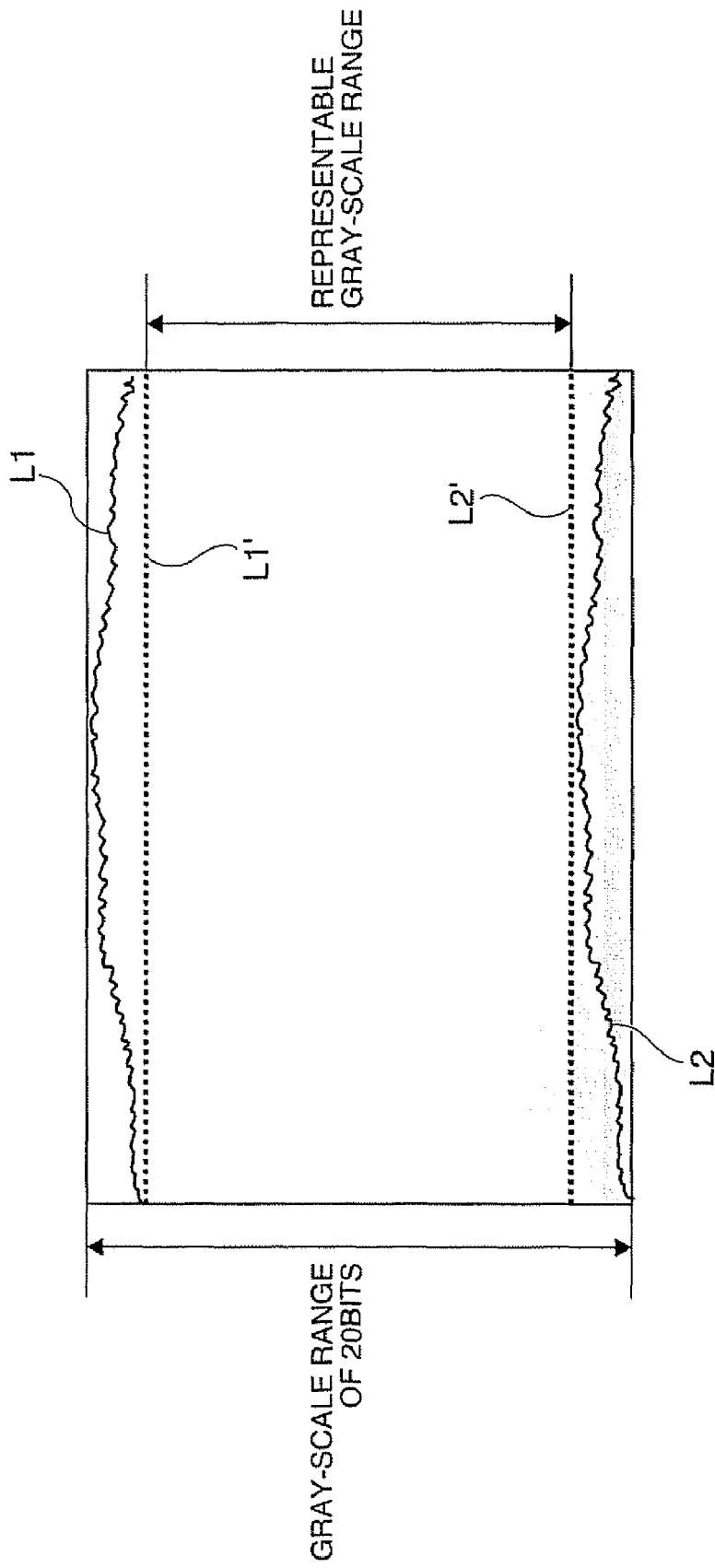
FIG. 7 is a diagram for explaining a range of a gray-scale of the projector according to the embodiment of the invention.

FIG. 7 is a diagram for explaining a range of a gray-scale of the projector according to the embodiment of the invention. In FIG. 7, a solid line L1 shows a variation in transmittance (gray-scale value) for obtaining, for example, the maximum brightness while a solid line L2 shows a variation in transmittance (gray-scale value) for obtaining, for example, the minimum brightness. In the case of correcting the variation shown by the solid line L1, the correction of adjustment to the lowest gray-scale level in the solid line L1 is executed while in the case of correcting the variation shown by the solid line L2, the correction of adjustment to the highest gray-scale level in the solid line L2 is executed.

Therefore, the representable gray-scale range in the corrected gray-scale value becomes the range between a broken lines L1' and L2'. However, since the representation with $2^{20}$ gray-scale levels (the gray-scale levels represented with 20 bits) is possible according to the embodiment of the invention as shown in fourth table shown in FIG. 5, the representable gray-scale range in the corrected gray-scale value dramatically increases in comparison with the gray-scale range (assumed to be a 10 bit gray-scale range in the embodiment of the invention) of a single image forming unit. Further, since the representation with $2^{20}$ gray-scale levels (gray-scale levels represented with 20 bits) is possible, the brightness correction process can be executed with high accuracy.

As described above, according to the projector related to the embodiment of the invention, by adopting the configuration shown in FIG. 1 as the optical system, and executing the brightness variation correction process by the software based image correction process in addition thereto as described in FIGS. 3A, 3B through 7, the brightness variation correction process with high accuracy becomes possible, and thus the color shading in the lateral direction of the image light projected on the projection surface can effectively be prevented.

Although the projectors according to the embodiments of the invention are explained hereinabove, the invention is not limited to the embodiments described above, but can be put into practice in various forms within the scope or the spirit of the invention, and the following modifications, for example, are also possible.

Figure 8:
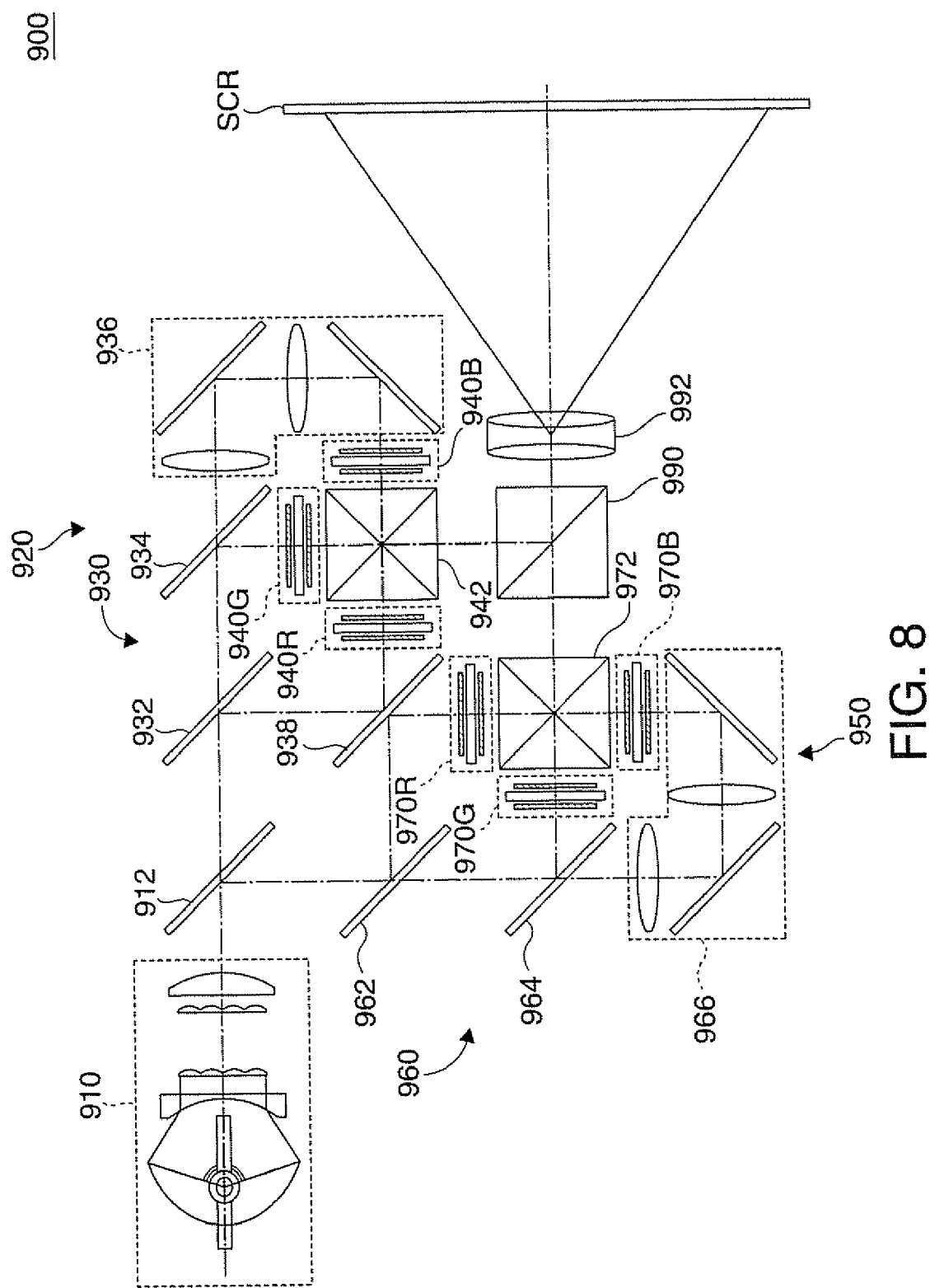
FIG. 8 is a diagram schematically showing an optical system of a projector 900 of the related art.
Figure 9A:
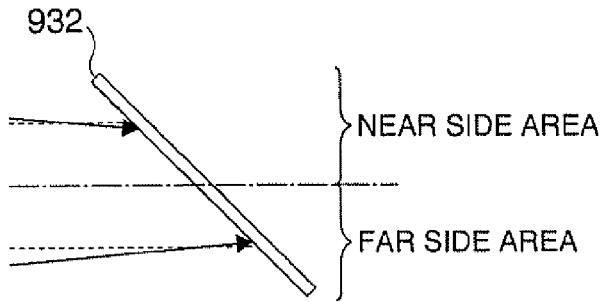
FIGS. 9A and 9B are diagrams provided for explaining a problem of the projector 900 of the related art.
Figure 9B:
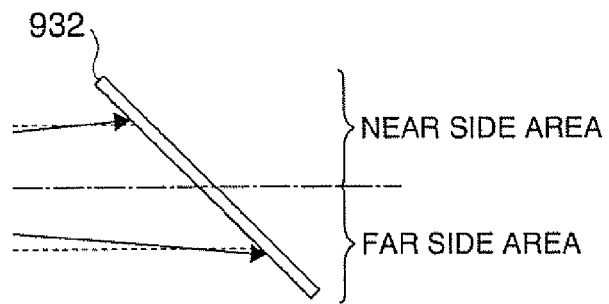
Figure 10:
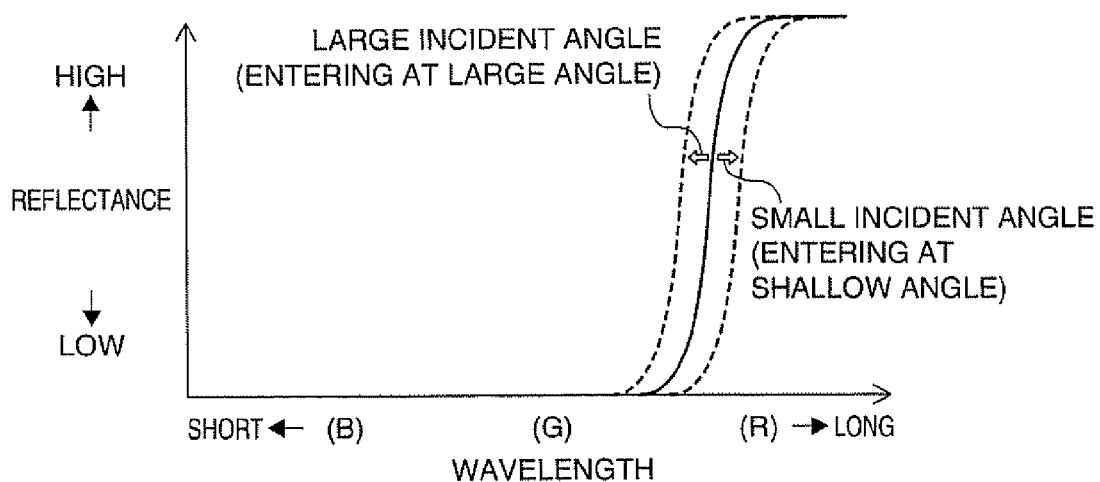
FIG. 10 is a diagram provided for explaining the spectral characteristic of the first dichroic mirror 932.
Figure 11:
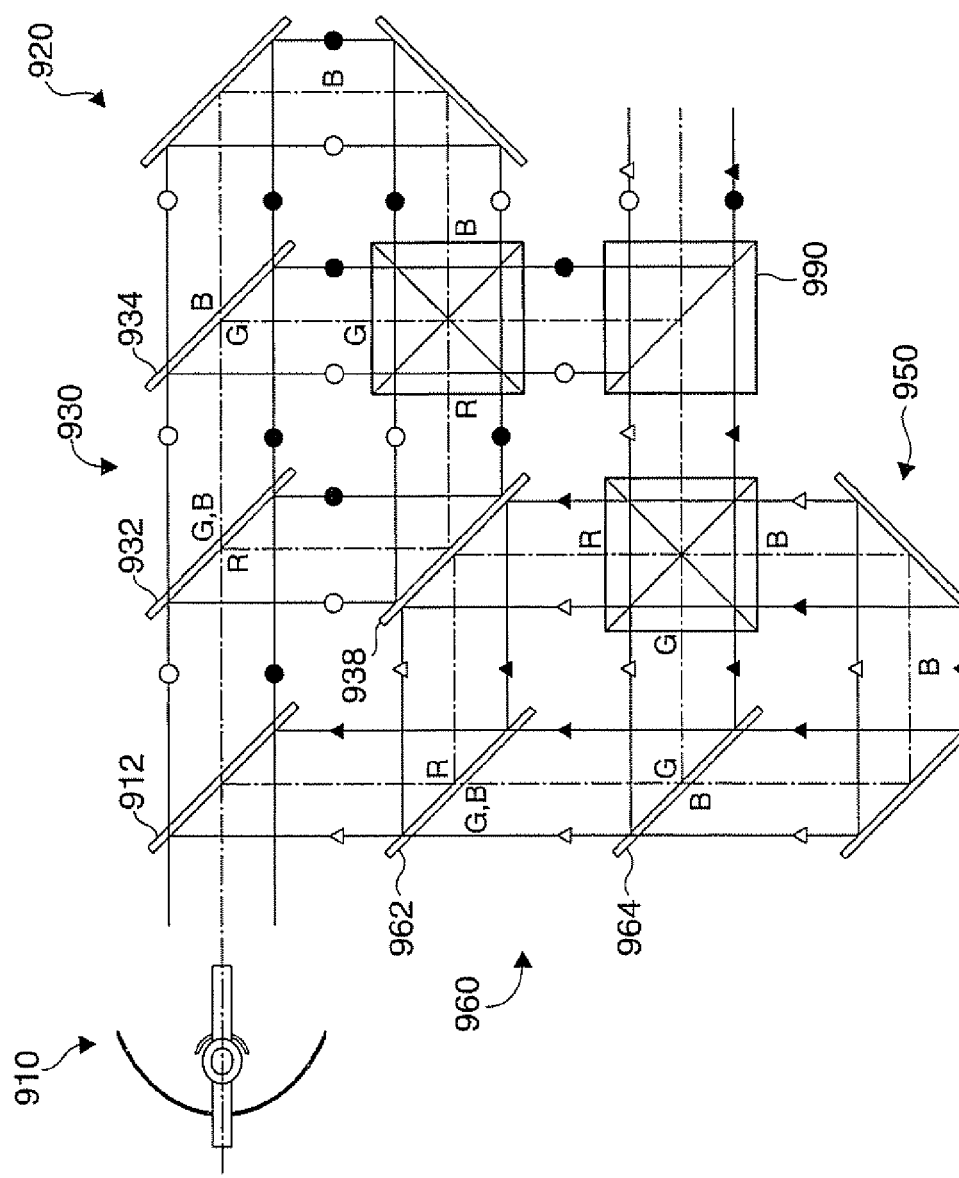
FIG. 11 is a diagram schematically showing light paths of the light beams passing through the projector 900 of the related art.

Although in the projector 10 according to the embodiment described above, there is explained the example having the configuration of the optical system as shown in FIG. 1 and executing the brightness variation correction process by the software based image correction process as explained with reference to FIGS. 3A, 3B, and 4 through 7, the optical system of the projector can have the configuration shown in FIG. 8 as explained in the related art section. Also in the projector having the optical system as shown in FIG. 8, the brightness variation correction process can be performed by executing the software based image correction process as described with reference to FIGS. 3A, 3B, and 4 through 7.

Although in the projector 10 according to the embodiment described above, the example of executing the brightness variation correction process on both the light modulation elements of the first image forming unit 1100 and the light modulation elements of the second image forming unit 2100 is explained, it is also possible to perform the brightness variation correction process only by either one of the first image forming unit 1100 and the second image forming unit 2100.

Although in projector 10 according to the embodiment described above, the polarization splitting mirror is used as the polarization splitting optical system, the invention is not limited to the polarization splitting mirror, but a polarization splitting prism (a polarizing beam splitter) can also be used. Further, although in the projector 10 according to the embodiment described above, the polarization combining prism is used as the polarization combining optical system, the invention is not limited to the polarization combining prism, but a polarization combining element having a polarization combining surface formed on a substrate can also be used.

Although in the projector 10 according to the embodiment described above, the lighting device having the light emission tube is used as the lighting device, the invention is not thus limited thereto. As the lighting device, a solid-state light source such as a light emitting diode (LED) or a semiconductor laser (LD) can also be used.

Although in the projector 10 according to the embodiment described above, the light modulation elements each having a transmissive liquid crystal panel are used as the light modulation elements, the invention is not limited thereto, but light modulation elements each having a reflective liquid crystal panel can also be used. In the case with the reflective liquid crystal panel, it becomes practicable by regarding the "transmittance" in the embodiment described above as "reflectance", and forming the first through fourth tables corresponding thereto.

Although in the projector 10 according to the embodiment described above, the light modulation elements having the liquid crystal panels are used as the light modulation elements, the invention is not limited thereto, but micromirror light modulation elements can also be used.

The invention can be applied to a front projection projector for performing projection from the side of observing the projection image, and also to a rear projection projector for performing projection from the side opposite to the side of observing the projection image.

Although in the projector 10 according to the embodiment described above, the first image forming unit 1100 and the second image forming unit 2100 are arranged to be lighted by the single lighting device, a configuration of providing the lighting devices (hereinafter referred to as a first lighting device and a second lighting device) corresponding respectively thereto can be adopted. In this case, the first lighting device has a configuration of emitting the light having the first polarization component and the second lighting device has a configuration of emitting the light having the second polarization component, thereby realizing a projector having the same function as in the embodiment described above.

Although in the projector 10 according to the embodiment described above, the first table and the second table show the transmittance correspondingly to each of the 1024 levels of gray-scale value (0 through 1023) and the voltage value thereof for obtaining the transmittance thereto, the voltage value applied correspondingly to each of the 1024 levels of gray-scale value (0 through 1023) and the transmittance thereof when the voltage value is applied thereto can be showed in the first table and the second table. The third table and the fourth table can be generated based on the first table and the second table.

Although in the projector 10 according to the embodiment described above, the transmittances of each light modulation element are showed in the first table and the second table, the transmittances are not required to be showed in the first table and the second table when combined normalized transmittance is showed in the third table.

Although in the projector 10 according to the embodiment described above, the first image light beam and the second image light beam are overlapped for every pixel, the pixels of the first image light beam and the pixels of the second image light beam are not required to be overlapped with each other completely. In this case, it is possible to use the combined transmittance or the combined reflectance in an area including both of the pixels of the respective image light beams.

The entire disclosure of Japanese Patent Application Nos. 2007-108978, filed Apr. 18, 2007 and 2008-059086, filed Mar. 10, 2008 are expressly incorporated by reference herein.

What is claimed is:

1. A projector comprising:
a lighting device for emitting light including a first colored light beam, a second colored light beam, and a third colored light beam;
a first image forming unit including a first color separation optical system for separating the light emitted from the lighting device into the first through third colored light beams, first through third light modulation elements for respectively modulating the first through third colored light beams separated by the first color separation optical system, and a first color combining optical system for combining the first through third colored light beams respectively modulated by the first through third light modulation elements to output a first image light beam;

a second image forming unit including a second color separation optical system for separating the light emitted from the lighting device into the first through third colored light beams, fourth through sixth light modulation elements for respectively modulating the first through third colored light beams separated by the second color separation optical system, and a second color combining optical system for combining the first through third colored light beams respectively modulated by the fourth through sixth light modulation elements to output a second image light beam;

a polarization combining optical system for combining the first image light beam emitted from the first image forming unit and the second image light beam emitted from the second image forming unit;

a projection optical system for projecting the image light beam combined by the polarization combining optical system; and an image correction device for outputting drive values corresponding to input image data and for driving respectively the first through sixth light modulation elements, wherein the image correction device, based on one of combined transmittance and combined reflectance obtained by combining one of transmittances and reflectances corresponding to gray-scale values of two of the first through sixth light modulation elements for modulating the same colored light beam for every combination of the gray-scale values which can be output by the two light modulation elements, obtains and outputs the drive value corresponding to the input image data corresponding to the predetermined colored light beam and for driving the two light modulation elements corresponding to the predetermined colored light beam.

2. The projector according to claim 1, wherein the image correction device sets one of the combined transmittance and the combined reflectance for every predetermined position in the two light modulation elements based on one of the combined transmittance and the combined reflectance thus combined and shot image data obtained by shooting the image corresponding to the image light beams projected from the projection optical system, and obtains the drive values for driving the two light modulation elements based on one of the combined transmittance and the combined reflectance thus set for each of the predetermined positions.

3. The projector according to claim 2, wherein the image correction device includes a first table, assuming that a gray-scale range which can be output by each of the first through third light modulation elements includes $2^n$ (n is an integer equal to or greater than one) gray-scale levels, for representing a relationship between each of the $2^n$ gray-scale levels and the drive value for the first through third light modulation elements corresponding to each of the $2^n$ gray-scale levels, a second table, assuming that a gray-scale range which can be output by each of the fourth through sixth light modulation elements includes $2^n$ (n is an integer equal to or greater than one) gray-scale levels, for representing a relationship between each of the $2^n$ gray-scale levels and the drive value for the fourth through sixth light modulation elements corresponding to each of the $2^n$ gray-scale levels, a fourth table formed based on a third table having values, as one of combined normalized transmittance and combined normalized reflectance obtained by normalizing the combined value, the values each obtained by combining one of the transmittances and the reflectances corresponding to each of the $2^n$ gray-scale levels of the two light modulation elements respectively for each of $2^{2n}$ sets of combinations of each of $2^n$ gray-scale levels of the two light modulation elements for modulating the same colored light out of the first through sixth light modulation elements, the fourth table capable of converting one of the combined normalized transmittance and the combined normalized reflectance corresponding to each of the $2^{2n}$ sets of combinations into the gray-scale values in the $2^n$ gray-scale levels of the two light modulation element, and an image correction processing section provided with a function of setting one of the combined normalized transmittance and the combined normalized reflectance for each of predetermined positions in the two light modulation elements based on the shot image data obtained by shooting the image corresponding to the image light beam projected from the projection optical system, obtaining gray-scale values in the $2^n$ gray-scale levels of the two light modulation elements corresponding to one of the combined normalized transmittance and the combined normalized reflectance set for each of the predetermined positions with reference to the fourth table, and obtaining, with reference to the first table and the second table, the drive values to the light modulation elements and corresponding to the gray-scale values of the first image forming unit and the second image forming unit from the obtained gray-scale values in the $2^n$ gray-scale levels of the two light modulation elements.

4. The projector according to claim 2, wherein the image correction device includes assuming that the gray-scale range which can be output by each of the first through third light modulation element includes $2^n$ (n is an integer equal to or greater than one) gray-scale levels, a fourth table representing a relationship between $2^{2n}$ sets of combinations of each of the $2^n$ gray-scale levels of the two light modulation elements for modulating the same colored light beam out of the first through sixth light modulation elements and one of combined normalized transmittance and combined normalized reflectance obtained by normalizing a combined value obtained by combining one of the transmittances and reflectances corresponding to each of the $2^n$ gray-scale levels of the two light modulation elements, and an image correction processing section having a function of setting one of the combined normalized transmittance and the combined normalized reflectance for each of the predetermined positions in the two light modulation elements based on the shot image data obtained by shooting the image corresponding to the image light beam projected from the projection optical system, and obtaining with reference to the fourth table the gray-scale values in the $2^n$ gray-scale levels of the two light modulation elements corresponding to one of the combined normalized transmittance and the combined normalized reflectance set for each of the predetermined positions.

5. The projector according to claim 2,
wherein one of the combined normalized transmittance and the combined normalized reflectance for each of the predetermined positions in the two light modulation elements is set based on the shot image data, so that the brightness variation existing in the shot image data is suppressed.

6. The projector according to claim 3,
wherein the fourth table has one of the combined normalized transmittance and the combined normalized reflectance arranged in the order of magnitude.

7. The projector according to claim 1,
wherein the first through sixth light modulation elements are light modulation elements using liquid crystal, and the drive values for driving the light modulation elements are voltage values applied to the light modulation elements.

8. The projector according to claim 1,
wherein the first color separation optical system includes a first dichroic mirror, which separates the light from the lighting device into the first colored light beam and the other colored light beams by reflecting the light in a certain wavelength range and transmitting the light in another wavelength range out of the light from the lighting device, and a second dichroic mirror, which separates the other colored light beams into the second colored light beam and the third colored light beam by reflecting the light in a certain wavelength range and transmitting the light in another wavelength range out of the other colored light beams separated by the first dichroic mirror,
the second color separation optical system includes a third dichroic mirror, which separates the light from the lighting device into the first colored light beam and the other colored light beams by reflecting the light in a certain wavelength range and transmitting the light in another wavelength range out of the light from the lighting device, and a fourth dichroic mirror, which separates the other colored light beams into the second colored light beam and the third colored light beam by reflecting the light in a certain wavelength range and transmitting the light in another wavelength range out of the other colored light beams separated by the third dichroic mirror,
in each of the first through third colored light beams,
the projector is configured so that the colored light beam one of reflected or transmitted in a near side area along the lighting beam axis in the first dichroic mirror and the colored light beam one of reflected or transmitted in a near side area along the lighting beam axis in the third dichroic mirror are projected on the projection screen in a laterally reversed manner, and
the projector is configured so that the colored light beam one of reflected or transmitted in a near side area along the lighting beam axis in the second dichroic mirror and the colored light beam one of reflected or transmitted in a near side area along the lighting beam axis in the fourth dichroic mirror are projected on the projection screen in a laterally reversed manner.

9. An image correction device used in a projector,
the projector including:
a lighting device for emitting light including a first colored light beam, a second colored light beam, and a third colored light beam,
a first image forming unit including a first color separation optical system for separating the light emitted from the lighting device into the first through third colored light beams, first through third light modulation elements for respectively modulating the first through third colored light beams separated by the first color separation optical system, and a first color combining optical system for combining the first through third colored light beams respectively modulated by the first through third light modulation elements to output a first image light beam,
a second image forming unit including a second color separation optical system for separating the light emitted from the lighting device into the first through third colored light beams, fourth through sixth light modulation elements for respectively modulating the first through third colored light beams separated by the second color separation optical system, and a second color combining optical system for combining the first through third colored light beams respectively modulated by the fourth through sixth light modulation elements to output a second image light beam,
a polarization combining optical system for combining the first image light beam emitted from the first image forming unit and the second image light beam emitted from the second image forming unit,
a projection optical system for projecting the image light beam combined by the polarization combining optical system, and
an image correction device for outputting drive values corresponding to input image data and for driving respectively the first through sixth light modulation elements,
wherein the image correction device sets one of the combined transmittance and the combined reflectance for every predetermined position in the two light modulation elements, based on one of combined transmittance and combined reflectance obtained by combining one of transmittances and reflectances corresponding to gray-scale values of the two light modulation elements for every combination of the gray-scale values which can be output by the two light modulation elements for modulating the same colored light beam out of the first through sixth light modulation elements and shot image data obtained by shooting the image corresponding to the image light beams projected from the projection optical system, and
obtains the drive values for driving the two light modulation elements based on one of the combined transmittance and the combined reflectance thus set for each of the predetermined positions.

10. An image correction method for use with a projector,
the projector including:
a lighting device for emitting light including a first colored light beam, a second colored light beam, and a third colored light beam,
a first image forming unit including a first color separation optical system for separating the light emitted from the lighting device into the first through third colored light beams, first through third light modulation elements for respectively modulating the first through third colored light beams separated by the first color separation optical system, and a first color combining optical system for combining the first through third colored light beams respectively modulated by the first through third light modulation elements to output a first image light beam,
a second image forming unit including a second color separation optical system for separating the light emitted from the lighting device into the first through third colored light beams, fourth through sixth light modulation elements for respectively modulating the first through third colored light beams separated by the second color separation optical system, and a second color combining optical system for combining the first through third colored light beams respectively modulated by the fourth through sixth light modulation elements to output a second image light beam, a polarization combining optical system for combining the first image light beam emitted from the first image forming unit and the second image light beam emitted from the second image forming unit, a projection optical system for projecting the image light beam combined by the polarization combining optical system, and an image correction device for outputting drive values corresponding to input image data and for driving respectively the first through sixth light modulation elements;

the method comprising: setting one of combined transmittance and combined reflectance obtained by combining one of transmittances and reflectances corresponding to gray-scale values of two of the first through sixth light modulation elements for modulating the same colored light beam for every combination of the gray-scale values which can be output by the two light modulation elements;

obtaining shot image data by shooting an image corresponding to the image light beam projected from the projection optical system;

setting one of the combined transmittance and the combined reflectance for each of the predetermined positions in the two light modulation elements based on one of the combined transmittance and the combined reflectance and the shot image data; and obtaining the drive values for driving the two light modulation elements based on one of the combined transmittance and the combined reflectance thus set for each of the predetermined positions.

* * * * *